United States Patent
Rubio et al.

(10) Patent No.: US 10,912,320 B2
(45) Date of Patent: Feb. 9, 2021

(54) WATER- AND ENERGY-SAVING SYSTEMS AND METHODS FOR PRODUCING LIME-COOKED MASA

(71) Applicant: GRUMA S.A.B. de C.V., San Pedro Garza Garcia (MX)

(72) Inventors: Felipe A. Rubio, Edinburg, TX (US); Roberto Contreras, Monterrey (MX)

(73) Assignee: GRUMA S.A.B. DE CV, Nuevo Leon (MX)

( * ) Notice: Subject to any disclaimer, the term of this patent is extended or adjusted under 35 U.S.C. 154(b) by 0 days.

(21) Appl. No.: 16/531,553

(22) Filed: Aug. 5, 2019

(65) Prior Publication Data

US 2020/0054051 A1 Feb. 20, 2020

Related U.S. Application Data

(60) Provisional application No. 62/765,075, filed on Aug. 17, 2018.

(51) Int. Cl.
*A21D 13/047* (2017.01)
*A21D 13/42* (2017.01)
(Continued)

(52) U.S. Cl.
CPC ............ *A23L 7/1975* (2016.08); *A21D 10/00* (2013.01); *A21D 13/047* (2017.01); *A21D 13/42* (2017.01);
(Continued)

(58) Field of Classification Search
CPC .......... A21D 3/42; A21D 8/02; A21D 13/047; A21D 13/42; A21D 10/00; B02B 1/04;
(Continued)

(56) References Cited

U.S. PATENT DOCUMENTS 6,056,990 A * 5/2000 Delrue ................... A21D 2/186
426/463
6,068,873 A 5/2000 Delrue et al.
(Continued)

OTHER PUBLICATIONS

International Search Report and Written Opinion issued by the United States International Searching Authority regarding International Application No. PCT/US2019/045236, dated Oct. 24, 2019, 18 pages.

(Continued)

*Primary Examiner* — Walter A Moore
(74) *Attorney, Agent, or Firm* — Haynes and Boone, LLP

(57) ABSTRACT

Water- and energy-saving systems and methods for producing lime-cooked masa are described. Such methods generally include adding water to maize kernel in a first predetermined proportion, the maize kernel having endosperm, germ, pericarp, and tip cap components. Using a first conditioner, the maize kernel is conditioned for a first predetermined amount of time to cause moisture absorption to within a first predetermined range. The maize kernel is limed. The maize kernel is cooked, using a cooker, in an environment of steam. After the maize kernel is cooked, water is added to the maize kernel in a second predetermined proportion and, using a second conditioner, the maize kernel is conditioned for a second predetermined amount of time to cause moisture absorption to within a second predetermined range. The maize kernel is milled using one or more mills.

5 Claims, 12 Drawing Sheets

(51) Int. Cl.
*A23L 7/10* (2016.01)
*A23L 5/10* (2016.01)
*A21D 10/00* (2006.01)
*B02B 1/08* (2006.01)
*B02B 1/02* (2006.01)

(52) U.S. Cl.
CPC *A23L 5/13* (2016.08); *B02B 1/02* (2013.01); *B02B 1/08* (2013.01); *A23V 2002/00* (2013.01)

(58) Field of Classification Search
CPC . B02B 1/08; B02B 1/02; A23L 7/1975; A23L 5/13
See application file for complete search history.

(56) References Cited

U.S. PATENT DOCUMENTS

| | | | |
|---|---|---|---|
| 6,326,045 | B1 | 12/2001 | Rubio et al. |
| 6,344,228 | B1 * | 2/2002 | Rubio .................. A21D 8/02 426/463 |
| 6,818,240 | B2 | 11/2004 | Brubacher et al. |
| 7,220,443 | B2 | 5/2007 | Rivero-Jiménez et al. |
| 7,704,537 | B2 | 4/2010 | Lopez et al. |
| 7,740,895 | B2 | 6/2010 | Eckhoff et al. |
| 7,939,121 | B2 | 5/2011 | Rivero-Jiménez et al. |
| 8,110,239 | B2 | 2/2012 | Wallens et al. |
| 9,113,651 | B2 | 8/2015 | Nussbaumer et al. |
| 9,604,220 | B2 | 3/2017 | Rubio et al. |
| 2003/0198725 | A1 | 10/2003 | Cardenas et al. |
| 2007/0148318 | A1 | 6/2007 | Rubio et al. |
| 2007/0184175 | A1 | 8/2007 | Rubio et al. |
| 2009/0098265 | A1 | 4/2009 | Kock et al. |
| 2016/0175845 | A1 | 6/2016 | Rubio et al. |
| 2017/0251679 | A1 | 9/2017 | Bartlett |

OTHER PUBLICATIONS

C. Durán-Debazúa et al., "Use of Anaerobic-Aerobic Treatment Systems for Maize Processing Installations: Applied Microbiology in Action" (2007), pp. 3-12, Communicating Current Research and Educational Topics and Trends in Applied Microbiology, A. Méndez-Vilas (Ed.).

Jeffrey A. Gwirtz et al., "Processing maize flour and corn meal food products" (2013), pp. 66-75, Annals of the New York Academy of Sciences, Ann. N. Y. Acad. Sci. ISSN 0077-8923.

Kurt A. Rosentrater et al., "Economic Simulation Modeling of Reprocessing Alternatives for Corn Masa Byproducts" (2003), pp. 341-367, 39 Resources, Conservation and Recycling.

Ricardo Bressani et al., "Nutritional Quality of Nixtamalized Corn Masa Flour. Achievement Through Fortification With Micronutrients" (1997), pp. 3-85, Fortification of Corn Masa Flour with Iron and/or Other Nutrients: A Literature and Industry Experience Review (SUSTAIN).

Stanley A. Watson, "Description, Development, Structure, and Composition of the Corn Kernel," Corn: Chemistry and Technology (2003), pp. 69-106, Pamela J. White & Lawrence A. Johnson eds., American Association of Cereal Chemists, Inc. 2nd ed.

F. R. Earle et al., "Composition of the Components Parts of the Corn Kernel" (1946), pp. 504-511, 23 Cereal Chemistry.

* cited by examiner

| NUTRITIONAL AND PROXIMATE COMPOSITION (g/100 g): | | | |
|---|---|---|---|
| NUTRIENT | LIME-COOKED MASA (LCM1) | NIXTAMAL MASA (NM) | WHOLE GRAIN MAIZE (WM) |
| WATER | 10.0 | 10.0 | 10.0 |
| PROTEIN | 8.5 (8-9) | 7.8 | 8.5 |
| FAT | 4.0 (3.5-4.5) | 3.2 | 3.9 |
| ASH | 1.3 (1.0-1.5) | 1.8 | 1.3 |
| CALCIUM | 0.10-0.15 | 0.14-0.20 | 0.01 |
| DIETARY FIBER: | 10.4 | 8.0 (7-9) | 10.4 |
| (% GLUCURONIC AS ALCOHOL INSOLUBLE FIBER-AIS: HEMICELLULOSE-B) | (4.0) | (2.0) | (6.0) |
| (% GLUCURONIC ACID AS WATER SOLUBLE FIBER) | (0.35) | (0.20) | (0.15) |
| RESISTANT STARCH (%) | (2.5) | (2.0) | (1.5) |
| CRUDE FIBER (CELLULOSE/LIGNIN) | (2.5) | (1.2) | (2.5) |
| STARCH | 65.8 | 69.2 | 65.9 |
| TOTAL CALORIES: | 322 | 327 | 321 |

Fig. 3

| PHYSICO-CHEMICAL PROPERTIES: | | | |
|---|---|---|---|
| | LIME-COOKED MASA (LCM1) | NIXTAMAL MASA (NM) | WHOLE MAIZE DOUGH (WM) |
| MOISTURE (%) | 40.0-45.0 | 45.0-50.0 | 35.0-40.0 |
| YIELD (g-dough/Kg-maize) | 1800 | 2200 | 1300-1500 |
| pH (11% SOLIDS) | 6.0-7.0 | 6.0-7.5 | 5.8-6.0 |
| VISCOSITY-14% SOLIDS: PEAK (95°C)/FINAL (50°C) | 2760 9800 | 3470 10090 | 5600 10300 |
| PARTICLE SIZE DISTRIBUTION (% OVER) | BIMODAL | BIMODAL | BIMODAL |
| US MESH 10 (2000 μ) US MESH 14 (1410 μ) US MESH 18 (1000 μ) US MESH 25 (710 μ) US MESH 35 (500 μ) | 0.0 5.0 15.0 5.0 8.0 | 0.0 0.0 5.0 25.0 30.0 | 0.0 0.0 0.0 5.0 10.0 |
| US MESH 45 (355 μ) US MESH 60 (250 μ) | 10.0 35.0 | 15.0 5.0 | 30.0 10.0 |
| US MESH 80 (180 μ) US MESH 100 (150 μ) US MESH 200 (74 μ) | 11.0 11.0 0.0 | 20.0 0.0 0.0 | 20.0 25.0 0.0 |

Fig. 4

| NUTRITIONAL AND PROXIMATE COMPOSITION (g/100 g): | | | |
|---|---|---|---|
| NUTRIENT | LIME-COOKED MASA (LCM2) | NIXTAMAL MASA (NM) | WHOLE GRAIN MAIZE (WM) |
| WATER | 10.0 | 10.0 | 10.0 |
| PROTEIN | 8.5 (8-9) | 7.8 | 8.5 |
| FAT | 4.0 (3.5-4.5) | 3.2 | 3.9 |
| ASH | 1.3 (1.0-1.5) | 1.8 | 1.3 |
| CALCIUM | 0.10-0.15 | 0.14-0.20 | 0.01 |
| DIETARY FIBER: | 8.5 | 8.0 (7-9) | 10.4 |
| (% GLUCURONIC AS ALCOHOL INSOLUBLE FIBER-AIS: HEMICELLULOSE-B) | (3.0) | (2.0) | (6.0) |
| (% GLUCURONIC ACID AS WATER SOLUBLE FIBER) | (0.25) | (0.20) | (0.15) |
| RESISTANT STARCH (%) | (2.5) | (2.0) | (1.5) |
| CRUDE FIBER (CELLULOSE/LIGNIN) | (1.2) | (1.2) | (2.5) |
| STARCH | 67.7 | 69.2 | 65.9 |
| TOTAL CALORIES: | 322 | 327 | 321 |

Fig. 7

| PHYSICO-CHEMICAL PROPERTIES: | | | |
|---|---|---|---|
| | LIME-COOKED MASA (LCM2) | NIXTAMAL MASA (NM) | WHOLE MAIZE DOUGH (WM) |
| MOISTURE (%) | 40.0-45.0 | 45.0-50.0 | 35.0-40.0 |
| YIELD (g-dough/Kg-maize) | 1800 | 2200 | 1300-1500 |
| pH (11% SOLIDS) | 6.0-7.0 | 6.0-7.5 | 5.8-6.0 |
| VISCOSITY-14% SOLIDS: | | | |
| PEAK (95°C) | 3000 | 3470 | 5600 |
| FINAL (50°C) | 9800 | 10090 | 10300 |
| PARTICLE SIZE DISTRIBUTION (% OVER) | BIMODAL | BIMODAL | BIMODAL |
| US MESH 10 (2000 μ) | 0.0 | 0.0 | 0.0 |
| US MESH 14 (1410 μ) | 0.0 | 0.0 | 0.0 |
| US MESH 18 (1000 μ) | 10.0 | 5.0 | 0.0 |
| US MESH 25 (710 μ) | 13.0 | 25.0 | 5.0 |
| US MESH 35 (500 μ) | 7.0 | 30.0 | 10.0 |
| US MESH 45 (355 μ) | 13.0 | 15.0 | 30.0 |
| US MESH 60 (250 μ) | 35.0 | 5.0 | 10.0 |
| US MESH 80 (180 μ) | 11.0 | 20.0 | 20.0 |
| US MESH 100 (150 μ) | 11.0 | 0.0 | 25.0 |
| US MESH 200 (74 μ) | 0.0 | 0.0 | 0.0 |

Fig. 8

| CONCEPT | LIME COOKED MASA | TRADITIONAL MASA 1 (MEXICAN INSTITUTE OF WATER TECHNOLOGY (INSTITUTO MEXICANO DE TECNOLOGÍA DEL AGUA (IMTA)), EVALUATION OF WATER CONSUMPTION AND EFFLUENT QUALITY GENERATED DURING THE TRADITIONAL NIXTAMILIZATION PROCESS AND ITS COMPARISON WITH THE MASECA PROCESS (2011)) | TRADITIONAL MASA 2 (C. DURAN-DE BAZUA et al., USE OF ANAEROBIC-AEROBIC TREATMENT SYSTEMS FOR MAIZE PROCESSING INSTALLATION: APPLIED MICROBIOLOGY IN ACTION, COMMUNICATING CURRENT RESEARCH AND EDUCATIONAL TOPICS AND TRENDS IN APPLIED MICROBIOLOGY 3-12 (A. MENDEZ ED., FORMATEX 2007)) | SAVINGS (%) |
|---|---|---|---|---|
| WATER CONSUMPTION (MAIZE:WATER) | 1:0.6 TO 1:0.76 | 1:5 | 1:6 | 87-89 |
| WASTEWATER (MAIZE:ALKALINE STEEPWATER) | 1:0 | 1:3.6 | 1:5 | 100 |
| ENERGY CONSUMPTION (GJ/ton) | 0.4 | 0.6 (MEASURED BY INVENTORS) | --- | 30 |
| SOLID WASTE (MAIZE BASE) | 1:0.0 | 1:0.10 | 1:0.11 | 10 |

Fig. 11

WATER- AND ENERGY-SAVING SYSTEMS AND METHODS FOR PRODUCING LIME-COOKED MASA

CROSS-REFERENCE TO RELATED APPLICATION

This application claims the benefit of the filing date of, and priority to, U.S. Application No. 62/765,075, filed Aug. 17, 2018, the entire disclosure of which is hereby incorporated herein by reference.

TECHNICAL FIELD

The present disclosure relates generally to lime-cooked masa production and, more particularly, to water- and energy-saving systems and methods for producing lime-cooked masa for the preparation of tortilla, snack, and other maize-based foods.

BACKGROUND

Maize, or corn, is a cereal grain. A maize kernel has five separable components, namely tip cap, pericarp (or hull), aleurone, endosperm, and germ components. Two industrial processes can be employed for transforming maize into food products, namely wet milling and dry milling. In wet milling processes, maize is separated into relatively pure chemical compound classes of starch, protein, oil, and fiber. In dry milling processes, a reduction in the particle size of clean maize occurs with or without separators (for degerming) or aspirators (for dehulling) so that all or some of the original germ and fiber (pericarp/hull) are retained. One type of wet milling process is nixtamal milling (or nixtamalization) in which whole maize kernels are soaked in a lime solution, cooked, steeped in cooking liquor, drained, and rinsed to yield nejayote (or alkaline steepwater). The process of nixtamal milling partially removes some of the germ and most of the pericarp. The partially-cooked maize (nixtamal) is then either ground to make a wet dough (masa) from which tortillas or snack foods can be formed, or is allowed to dry before being milled into masa flour.

The traditional or household preparation of cooking maize with lime at the rural level requires hard labor and is time consuming (around 14 to 20 hours). Most of this time is taken by cooking and steeping/washing operations; this time can be decreased to 6-12 hours at the urban or cottage level (with 5% to 17% wastewater solid loss). C. Duran-de Bazua et al., *Use of Anaerobic-Aerobic Treatment Systems for Maize Processing Installation: Applied Microbiology In Action, Communicating Current* Research and Educational Topics and Trends in Applied Microbiology 3-12 (A. Mendez ed., Formatex 2007); Kurt A. Rosentrater et al., *Economic Simulation Modeling of Reprocessing Alternatives for Corn Masa Byproducts,* 39 Resources, Conservation and Recycling, 341-367 (2003); Ricardo Bressani et al., Fortification of Corn Masa Flour with Iron and/or Other Nutrients: A Literature and Industry Experience Review 4-85 (SUSTAIN 1997). In modern processes, lime (0.5% to 1.5% based on grain) is mixed with 1 to 1.5 parts of water for each part of maize. The mixture/suspension is cooked by boiling or steam injection and, while the hull/tip cap is partially removed during cooking/washing, there is still fiber left. After steeping, the alkaline steepwater, which contains dissolved hull/aleurone and germ, along with undissolved lime, is discarded. Further, the maize kernels are washed thoroughly of remaining liquid, so that the residual hulls can be removed manually (for small-scale (<4 tons/day) processes) or mechanically (for large-scale (>10 tons/day) nixtamal mills). At the industrial scale (100-500 tons/day), this dehydration step is a major cost factor.

The human food supply chain contributes to 30% of carbon dioxide emissions, but this environmental burden can decrease with clean energy technology that creates products and services sustainably. Elevated prices of fossil fuels, such as fuel oil and natural gas (55 kg of $CO_2$/MMBTU), allow competition from maize as biofuel (e.g., biomass: 110 kg $CO_2$/MMBTU or ethanol: 70 kg $CO_2$/MMBTU), which can increase competition for food supply and aggravate malnutrition around the world. In addition, costs associated with water usage and its environmental treatment affect sustainability in expanding nixtamal mills, especially in areas where water is scarce due to increasing climate change (e.g., >2° C. above the pre-industrial average) from $CO_2$ emissions (e.g., >380 ppmv). It would therefore be desirable to provide a low or zero-carbon energy process for producing lime-cooked masa that would contribute to the stabilization of greenhouse gas concentration by reducing or avoiding energy-related emissions. Moreover, in contrast to the above-described processes, it would be desirable to provide a process for the continuous production of lime-cooked masa that produces no (or negligible) wastewater.

Therefore, what is needed is an apparatus, system, and/or method that addresses one or more of the foregoing issues, and/or one or more other issues.

BRIEF DESCRIPTION OF THE DRAWINGS

FIG. 3 is a table showing nutritional average compositions for lime-cooked masa (LCM) prepared by the method of FIG. 2 as compared to traditional nixtamal masa (NM) and whole grain maize (WM), according to one or more embodiments of the present disclosure.

FIG. 4 is a table showing the physicochemical content of the lime-cooked masa (LCM) prepared by the method of FIG. 2 as compared to traditional nixtamal masa and whole maize dough (WM), according to one or more embodiments of the present disclosure.

FIG. 7 is a table showing nutritional average compositions for lime-cooked masa (LCM) prepared by the method of FIG. 6 as compared to traditional nixtamal masa and whole maize (WM), according to one or more embodiments of the present disclosure.

FIG. 8 is a table showing the physicochemical content of the lime-cooked masa (LCM) prepared by the method of FIG. 6 as compared to nixtamal maize and whole maize dough, according to one or more embodiments of the present disclosure.

FIG. 11 is a table comparing water and energy consumption, as well as solid waste and wastewater, between traditional masa production and lime-cooked masa prepared using one or more embodiments of the present disclosure.

DETAILED DESCRIPTION

The present disclosure provides a process that departs from existing nixtamalization processes for whole cereal grains such as, for example, maize, to produce lime-cooked masa. This process involves a thermo-alkaline treatment that produces no (or negligible) wastewater with reduced steam heating consumption, while producing a high yield of the desired food product. In some embodiments, one objective is to employ an industrial process with an atmospheric steamer to continuously produce cooked coarse-sized and fine-sized dough fractions and also to yield a wasteless or a reduced waste lime-cooked masa. In some embodiments, another objective is to provide a lime-cooked masa for tortillas and snacks that is uniform and improved in its nutritional and physico-chemical properties.

Figure 1:
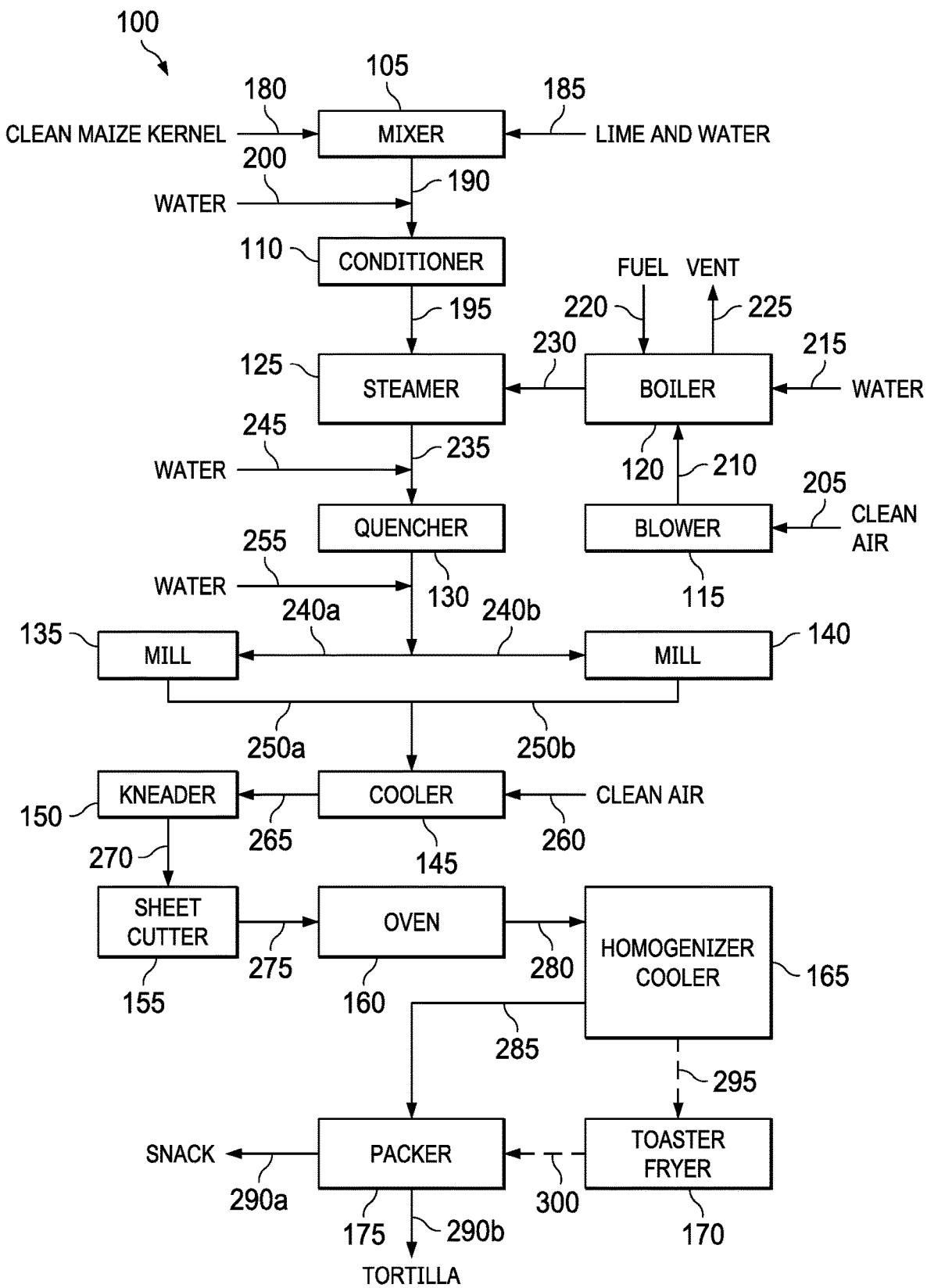
FIG. 1 is a diagrammatic illustration of a system adapted to make lime-cooked masa, according to one or more embodiments of the present disclosure.

In an embodiment, as illustrated in FIG. 1, a system adapted to make lime-cooked masa is generally referred to by the reference numeral 100. The system 100 includes a moisturizer such as, for example, a mixer 105. A conditioner 110 is operably coupled to the mixer 105. A blower 115 is operably coupled to a boiler 120. A cooker such as, for example, a steamer 125, is operably coupled to the boiler 120. The steamer 125 is also operably coupled to the conditioner 110. A conditioner such as, for example, a quencher 130, is operably coupled to the steamer 125. Mills 135 and 140 are each operably coupled to the quencher 130. A cooler 145 is operably coupled to each of the mills 135 and 140. A kneader 150 is operably coupled to the cooler 145. A sheet cutter 155 is operably coupled to the kneader 150. An oven 160 is operably coupled to the sheet cutter 155. A cooler such as, for example, a homogenizer cooler 165, is operably coupled to the oven 160. A toaster/fryer 170 is operably coupled to the homogenizer cooler 165. In some embodiments, the toaster/fryer 170 includes a fryer and a cooling section (not shown) located downstream of the fryer; in some embodiments, the cooling section of the toaster/fryer 170 is, or includes, one or more clean air fans. A packer 175 is operably coupled to each of the homogenizer cooler 165 and the toaster/fryer 170.

In operation, with continuing reference to FIG. 1, the mixer 105 receives clean maize kernel, as indicated by arrow 180, receives a lime solution containing water and lime, as indicated by arrow 185, limes the received clean maize by mixing the received clean maize kernel with the received lime solution, and discharges the mixture, as indicated by arrow 190. In some embodiments, the mixture of the received clean maize kernel and the received lime solution contains 0.1-0.3% by weight lime to maize kernel. On a dry weight basis, the maize kernel has tip cap (e.g., 0.8-1.1% by weight), pericarp/hull (e.g., 5.1-5.7% by weight), aleurone (2% by weight), endosperm (e.g., 81.1-83.5% by weight), and germ (e.g., 10.2-11.9% by weight). The pericarp contains 90% insoluble fiber (e.g., 67% hemicellulose-heteroxylans, 23% cellulose, 5-7% glucuronic acid, and 0.1% lignin). Stanley A. Watson, *Description, Development, Structure and Composition of the Corn Kernel*, Corn: Chemistry and Technology 69-106 (Pamela J. White & Lawrence A. Johnson eds., American Association of Cereal Chemists, Inc. 2nd ed. 2003); F. R. Earle et al., *Composition of the Components Parts of the Maize Kernel*, 23 Cereal Chemistry, 504-511 (1946).

The conditioner 110 receives the mixture discharged from the mixer 105, as indicated by the arrow 190, tempers the mixture causing additional moisture absorption, and discharges the tempered mixture, as indicated by arrow 195. In some embodiments, the conditioner 110 includes a feeder adapted to receive the mixture discharged from the mixer 105. In some embodiments, as in FIG. 1, water is added to the mixture discharged from the mixer 105, as indicated by arrow 200, before, during, or after the discharged mixture is received by the conditioner 110.

The blower 115 blows clean air to the boiler 120, as indicated by arrows 205 and 210, and the boiler 120, in turn, receives water, as indicated by arrow 215, receives the clean air from the blower 115, as indicated by the arrow 210, receives fuel (e.g., natural gas), as indicated by arrow 220, boils the received water by burning the received fuel and clean air, vents exhaust from the burnt fuel, as indicated by arrow 225, and discharges steam produced by the boiled water, as indicated by arrow 230.

The steamer 125 receives the tempered mixture discharged from the conditioner 110, as indicated by the arrow 195, receives the steam discharged from the boiler 120, as indicated by the arrow 230, precooks the received mixture with the received steam, and discharges the precooked mixture, as indicated by arrow 235. In some embodiments, the steamer 125 is or includes a rotary cylinder chamber and/or a heat-transfer screw conveyer. In some embodiments, the steamer 125 includes a feeder adapted to receive the tempered mixture from the conditioner 110. As described herein, steaming is a thermal process by which food is heated for the purpose of inactivating enzymes, modifying texture, and/or preserving color, flavor, and nutritional value. Hot water and steam can be used as heating media, but hot gas (dry-heat) can also be used. Steam infusion heating is a direct-contact process where condensation occurs on the surface of a flowable food, under atmospheric pressure. This process requires atmospheric steam, pumpable food and mechanical device to facilitate steam heating/condensation.

The quencher 130 receives the precooked mixture discharged from the steamer 125, as indicated by the arrow 235, tempers the precooked mixture causing cooling and additional moisture absorption, and discharges the tempered mixture, as indicated by arrows 240a and 240b. In some embodiments, the quencher 130 includes a feeder adapted to receive the precooked mixture discharged from the steamer 125. In some embodiments, as in FIG. 1, water is added to the precooked mixture discharged from the steamer 125, as indicated by arrow 245, before, during, or after the precooked mixture is received by the quencher 130.

The mill 135 receives at least a first portion of the tempered mixture discharged from the quencher 130, as indicated by the arrow 240a, grinds the first portion into the fine-ground dough material, and discharges the fine-ground dough material, as indicated by arrow 250a. In some embodiments, the mill 135 includes a feeder adapted to receive the first portion of the tempered mixture discharged from the quencher 130. In some embodiments, the mill 135 is a gravity-fed attrition mill (e.g., a stone mill or gap mill). In some embodiments, a stone gap in the mill 135 measures 1,000 microns. Similarly, the mill 140 receives at least a second portion of the tempered mixture discharged from the quencher 130, as indicated by the arrow 240b, grinds the second portion into the coarse-ground dough material, and discharges the coarse-ground dough material, as indicated by arrow 250b. In some embodiments, the mill 140 includes a feeder adapted to receive the second portion of the tempered mixture discharged from the quencher 130. In some embodiments, the mill 140 is a gravity-fed attrition mill (e.g., a stone mill or gap mill). In some embodiments, a stone gap in the mill 140 measures 2,000 microns. In some embodiments, as in FIG. 1, water is added to the tempered mixture discharged from the quencher, as indicated by arrow 255, before, during, or after the tempered mixture is received by the mill 135 or the mill 140.

The cooler 145 receives the fine-ground dough material from the mill 135, as indicated by the arrow 250a, receives the coarse-ground dough material from the mill 140, as indicated by the arrow 250b, receives clean air (e.g., discharged from the blower 115), as indicated by arrow 260, cools the received dough materials with the received clean air, and discharges the cooled dough materials, as indicated by arrow 265. In some embodiments, the cooler 145 includes a belt conveyor adapted to receive the fine-ground dough material from the mill 135, and to receive the coarse-ground dough material from the mill 140.

The kneader 150 receives the cooled dough materials discharged from the cooler 145, as indicated by the arrow 265, mixes the cooled dough materials into a lime-cooked masa, and discharges the lime-cooked masa, as indicated by arrow 270.

The sheet cutter 155 receives the lime-cooked masa from the kneader 150, as indicated by the arrow 270, forms the lime-cooked masa into sheets, cuts individual pieces from the sheets, and discharges the individual pieces, as indicated by arrow 275.

The oven 160 receives the individual pieces discharged from the sheet cutter 155, as indicated by the arrow 275, bakes the received individual pieces, and discharges the baked individual pieces, as indicated by arrow 280. In some embodiments, the oven 160 is a three-tiered, gas-fired oven.

The homogenizer cooler 165 receives the baked individual pieces discharged from the oven, as indicated by the arrow 280, cools and homogenizes moisture of the baked individual pieces, and discharges the cooled individual pieces, as indicated by arrow 285. In some embodiments, the homogenizer cooler 165 includes a series of open tiers.

In some embodiments, the packer 175 receives the cooled individual pieces discharged from the homogenizer cooler 165, as indicated by the arrow 285, packages the cooled individual pieces in snack- or tortilla-sized portions, and discharges the packaged portions, as indicate by arrows 290a and/or 290b. In addition, or instead, the toaster/fryer 170 may receive at least a portion of the cooled individual pieces discharged from the homogenizer cooler 165, as indicated by arrow 295, fry the cooled individual pieces and cool them again in the cooling section of the toaster/fryer 170, and discharge the fried individual pieces, as indicated by arrow 300. In such instances, the packer 175 receives the fried individual pieces discharged from the toaster/fryer 170, as indicated by the arrow 300, packages the fried individual pieces in snack- or tortilla-sized portions, and discharges the packaged portions, as indicated by the arrows 290a and/or 290b.

Figure 2:
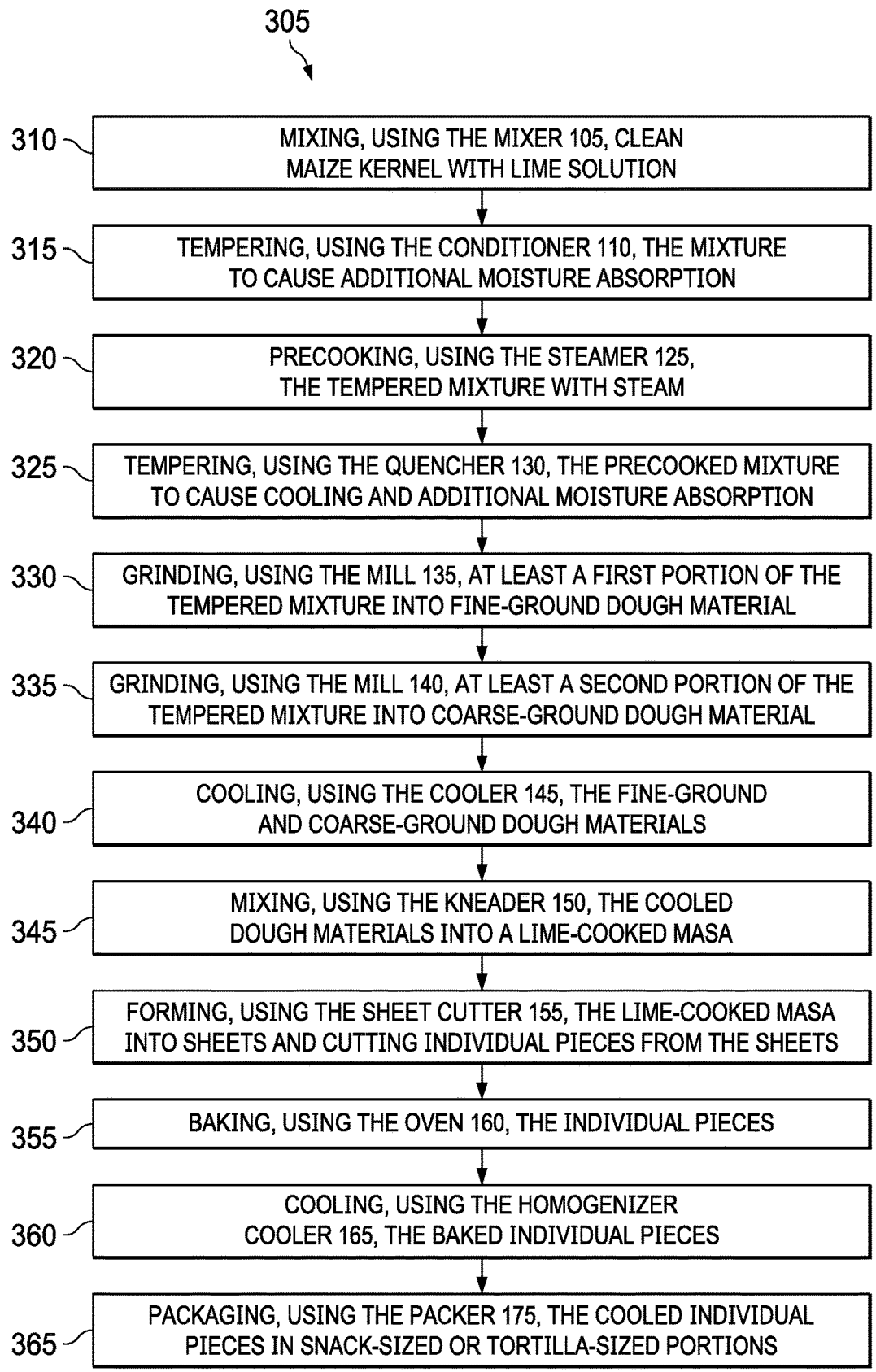
FIG. 2 is a flow diagram of a method of making lime-cooked masa using the system of FIG. 1, according to one or more embodiments of the present disclosure.

In an embodiment, as illustrated in FIG. 2, a method of making lime-cooked masa using the system 100 is generally referred to by the reference numeral 305. The method 305 includes at a step 310, mixing, using the mixer 105, maize kernel with lime solution to lime the maize kernel. In some embodiments, the mixture contains 0.1-0.3% by weight lime to maize kernel. In some embodiments, the maize kernel is dry-cleaned prior to mixing with the lime solution. The maize kernel may be a maize grain such as, for example, *Zea Mays* subspecies *Parviglumis* or *Mexicana* (e.g., white maize, yellow maize, blue maize, quality-protein maize, waxy maize, and/or high-amylose maize) or another cereal grain. The lime solution may contain 1% to 5% lime by weight; for example, the lime solution may contain 2% to 3% lime by weight. The cleaned maize kernel is thoroughly sprayed with the lime solution for 5 to 10 minutes to uniformly wet the kernel surface. In some embodiments, a solid to water ratio from 1:0.04 to 1:0.07 is maintained in the mixer 105 during the step 310. As a result, the moisture content of the maize kernel is adjusted from 12% or 13% to 17% or 18% during the step 310.

At a step 315, the conditioner 110 tempers the mixture to cause additional moisture absorption. In some embodiments, the mixture is tempered for 20 to 40 minutes at temperatures from 25° C. to 30° C. Water is added to the mixture before and/or during the tempering of the mixture by the conditioner 110. More particularly, in some embodiments, a solid to water ratio from 1:0.13 to 1:0.19 is maintained in the conditioner 110 during the step 315. As a result, the moisture content of the maize kernel is adjusted to 25% to 30% during the step 315; for example, the moisture content of the maize kernel may be adjusted to 28% to 30%.

At a step 320, the steamer 125 precooks the tempered mixture with steam (e.g., saturated steam). In some embodiments, the tempered mixture is precooked for 5 to 10 minutes at temperatures from 80° C. to 95° C. and at steam pressures from 90 kPa to 110 kPa (or 13.1-16.0 psi); for example, the tempered mixture may be precooked at a steam pressure of 101 kPa (or 14.7 psi) for a desired time to control temperature. As a result, the tempered mixture is heated and rehydrated (i.e., from steam condensate), and the moisture content of the maize kernel is adjusted to 30% to 42%; for example, the moisture content of the maize kernel may be adjusted to 32% to 38%; for another example, the moisture content of the maize kernel may be adjusted to 34% to 36%. In some embodiments, execution of the step 320 causes hydrolysis of the external-most layers of the maize kernel (i.e., the pericarp, the tip cap, and the aleurone) and partial hydrolysis or gelatinization of the internal-most layers of the maize kernel (i.e., the endosperm and the germ). As a result, the bran (i.e., the pericarp and the tip cap) is preserved so that the calcium bound in the resulting lime-cooked masa is increased for human nutrition (as compared to nixtamal masa and whole maize).

At a step 325, the quencher 130 tempers the precooked mixture to cause cooling and additional moisture absorption through the bran (i.e., the pericarp and tip cap). In some embodiments, the precooked mixture is tempered for 30 to 60 minutes at temperatures from 65° C. to 80° C. Water is added to the precooked mixture before and/or during tempering of the precooked mixture by the quencher 130. More particularly, in some embodiments, a solid to water ratio from 1:0.06 to 1:0.24 is maintained in the quencher 130 during the step 325. As a result, the moisture content of the maize kernel is adjusted to 35% to 47% during the step 325; for example, the moisture content of the maize kernel may be adjusted to 39% to 41%. Once tempered, the kernel is hard enough to be milled more efficiently than higher moisture and more elastic grains, while maintaining sufficient elasticity to avoid overheating during milling (which can cause starch damage in masa products).

At a step 330, the mill 135 grinds a first portion of the tempered mixture into a fine-ground dough material. Similarly, at a step 335, the mill 140 grinds a second portion of the tempered mixture into a coarse-ground dough material. Water is added to the tempered mixture before and/or during the grinding of the first and second portions by the respective mills 135 and 140. More particularly, in some embodiments, a solid to water ratio from 1:0.12 to 1:0.27 is maintained in the respective mills 135 and 140 during the steps 330 and 335. As a result, the moisture content of the maize kernel is adjusted to 40% to 52% during the steps 330 and 335; for example, the moisture content of the maize kernel may be adjusted to 44% to 46%. In addition, the added water cools the grinding stones of the respective mills 135 and 140 to temperatures from 45° C. to 60° C. During the steps 330 and 335, the mills 135 and 140 grind and abrade the first and second portions of the tempered mixture into a coarse-ground (larger-sized) fraction and a fine-ground (smaller-sized) fraction. The coarse-ground fraction (e.g., 14-35 mesh) may be used to produce snacks. The fine-ground fraction (e.g., 45-100 mesh) may be used to produce lime-cooked tortilla. Bimodal particle size distribution of the coarse-ground and fine-ground fractions is directly related to the respective sizes of the stone gaps in the mills 135 and 140, the pressure between the respective rotor and stator stones of the mills 135 and 140, the relative surface velocities of the respective rotor and stator stones of the mills 135 and 140, and/or the apparent viscosity of the desired end product.

At a step 340, the cooler 145 cools the fine-ground and coarse-ground dough materials with clean air (e.g., supplied from the blower 115). In some embodiments, the dough materials are cooled for 5 minutes. As a result, the moisture content of the dough materials is adjusted to 38% to 50% during the step 340; for example, the moisture content of the dough materials may be adjusted to 42% to 45%.

At a step 345, the kneader 150 mixes the cooled dough materials together to form a lime-cooked masa. In some embodiments, the lime-cooked masa is uniformly mixed, plastic (elastic), and cohesive (viscous).

At a step 350, the sheet cutter 155 forms the lime-cooked masa into sheets and cuts individual pieces (e.g., disk- or triangular-shaped) from the sheets. In some embodiments, the sheets are cut into the individual pieces by a rotating cutter.

At a step 355, the oven 160 bakes the individual pieces. In some embodiments, the individual pieces are baked for 20 to 40 seconds at temperatures from 280° C. to 300° C.

At a step 360, the homogenizer cooler 165 cools the baked individual pieces (e.g., with clean air supplied from the blower 115).

At a step 365, the packer 175 packages the cooled individual pieces in snack- or tortilla-sized portions. In some embodiments, the cooled individual pieces are packaged in the tortilla-sized portions with a moisture content 40% to 50%. In other embodiments, the toaster/fryer 170 bakes or fries the cooled individual pieces before the packer 175 packages the baked or fried individual pieces in the snack-sized portions. For example, the cooled individual pieces may be baked for 35 to 50 seconds at temperatures from 260° C. to 290° C., or fried (e.g., in vegetable oil) for 50 to 80 seconds at temperatures from 170° C. to 190° C. The baked or fried individual pieces are then packaged (e.g., laminated in plastic bags) in the snack-sized portions (e.g., as whole snacks) with a moisture content of less than 1.5%.

Turning to FIG. 3, a table showing nutritional average compositions for lime-cooked masa prepared by the method 305 ("LCM1"), nixtamal masa ("NM"), and whole maize ("WM") is illustrated; composition values shown in the table are based on a moisture content of 10%. The LCM1 and the NM each include a network of solubilized starch and non-starch polymers (continuous phase) supporting dispersed, uncooked, and swollen protein-starch granules, fiber cell fragments, and lipids (dispersed phase). Both the LCM1 and the NM contain particles from the endosperm and the germ; however, the LCM1 and the NM contain different content from the bran (i.e., the pericarp and the tip cap). Consequently, as shown in FIG. 3, the LCM1 contains 10.4% dietary fiber and 0.15% calcium. Moreover, the LCM1 has, on average, a higher nutritional value as compared to the NM, with more protein (at ~9%), ~25% more fat, ~30% more dietary fiber, ~100% more crude fiber, and ~25% more resistant starch. Dietary fiber may be described as a carbohydrate polymer with ten or more monomeric units (which are not hydrolyzed by the endogenous amylases in the small intestine) belonging to one of three categories: (i) naturally occurring edible carbohydrates in consumed food; (ii) carbohydrates obtained from raw food by physical, chemical, or enzymatic treatments and which have been shown to physiologically benefit health; and (iii) synthetic carbohydrates with a (claimed) health benefit. Prebiotic resistant starch (RS3: retrograded after heat-cool cycles) is included in this definition because it is obtained from maize and partially fermented by colonic bacteria.

In some embodiments, due to the inclusion of, or similarities to, other minimal processing techniques in the production of the LCM1 (e.g., cracking, crushing, rolling, lightly pearling, and/or steaming), the LCM1 is considered "whole grain". Other benefits associated with the LCM1 include, but are not limited to, organoleptic benefits (e.g., improved flavor and texture for tortillas) and other nutritional benefits (e.g., unbound niacin for pellagra prevention, bound calcium for osteoporosis, etc.). For example, the functional gum-like dispersion of the LCM1 (from 0.3% to 0.4% acidic soluble fiber) may impart not only a high water-binding capacity and viscosity, but also yields a biofunctional treatment for osteoporosis. Moreover, the LCM1 has improved tortilla texture and higher calcium availability (associated with bran acidic groups).

Turning to FIG. 4, a table showing the physico-chemical content of the LCM1 (i.e., prepared by the method 305), the NM, and the WM (i.e., dry-milled dough) is illustrated. On a percentage-by-weight basis, both the LCM1 and the NM have bimodal distributions containing a smaller- and a larger-sized group of particles as described by their modes. More particularly, the LCM1 yields a larger-sized mode (i.e., 18 mesh or 1,000 microns with 15% weight) and a smaller-sized mode (i.e., 60 mesh or 250 microns and 35% weight) appropriate for tortilla and snack making. The NM also yields a larger-sized mode (i.e., 35 mesh or 500 microns and 30% weight) and a smaller-sized mode (i.e., 80 mesh or 180 microns and 20% weight). However, as compared to the NM dough (at ~60%), the LCM1 dough has a lower weight fraction (~33%) above 45 mesh or 355 microns. The difference in size and weight between the larger-sized mode of the LCM1 and the larger-sized mode of the NM causes the apparent peak viscosity of the LCM1 (~2,760 centipoise) (at 95° C.) to be lower than the apparent peak viscosity of the NM (~3,470 centipoise). This difference in apparent peak viscosity may be (at least partially) attributable to: free starch particles increasing the viscosity of the NM during pasting (i.e., at 14% solids content); and slower water diffusion into, and swelling of, the LCM1's coarser particles. Finally, the WM contains smaller and finer particles (i.e., 355 microns) than both the LCM1 and the NM; as a result, the WM has an even higher apparent peak viscosity (~5,600 centipoise).

Figure 5:
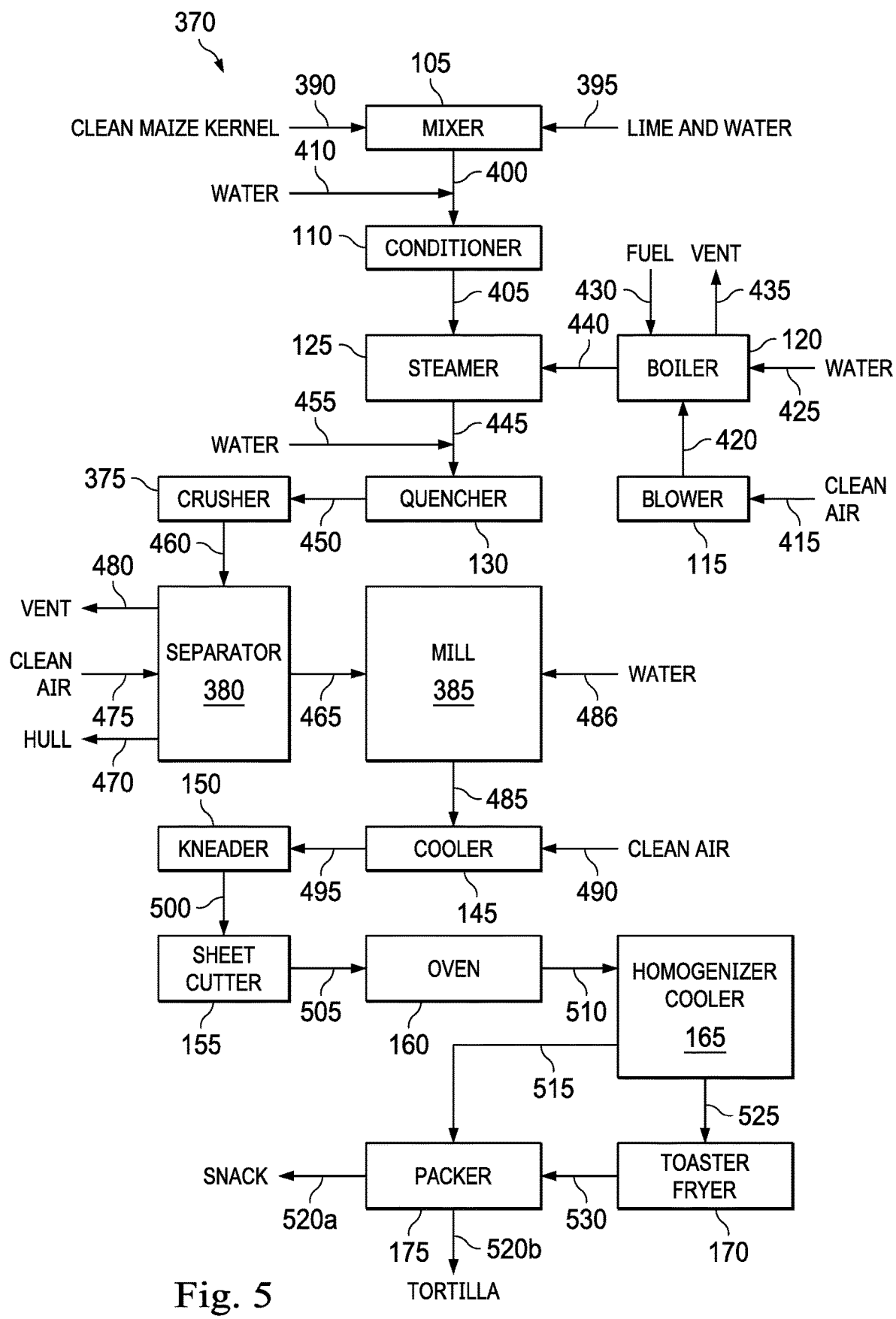
FIG. 5 is a diagrammatic illustration of another system adapted to make lime-cooked masa, according to one or more embodiments of the present disclosure.

In an embodiment, as illustrated in FIG. 5, another system adapted to make lime-cooked masa is generally referred to by the reference numeral 370. The system 370 includes several components substantially identical to corresponding components of the system 100, which substantially identical components are given the same reference numerals. However, the system 370 also includes several components that are different from components of the system 100; more particularly, the system 370 does not include the mills 135 and 140, but instead includes a crusher 375, a separator 380, and a mill 385. Accordingly, as shown in FIG. 5, the system 370 includes the mixer 105, to which the conditioner 110 is operably coupled. The steamer 125 is operably coupled to the conditioner 110. The boiler 120 is operably coupled to the steamer 125. The blower 115 is operably coupled to the boiler 120. The quencher 130 is operably coupled to the steamer 125. The crusher 375 is operably coupled to the quencher 130. The separator 380 is operably coupled to the crusher 375. The mill 385 is operably coupled to the separator 380. The cooler 145 is operably coupled to the mill 385. The kneader 150 is operably coupled to the cooler 145. The sheet cutter 155 is operably coupled to the kneader 150. The oven 160 is operably coupled to the sheet cutter 155. The homogenizer cooler 165 is operably coupled to the oven 160. The toaster/fryer 170 is operably coupled to the homogenizer cooler 165. As noted above, in some embodiments, the toaster/fryer 170 includes a fryer and a cooling section (not shown) located downstream of the fryer; in some embodiments, the cooling section of the toaster/fryer 170 is, or includes, one or more clean air fans. The packer 175 is operably coupled to each of the homogenizer cooler 165 and the toaster/fryer 170.

In operation, with continuing reference to FIG. 5, the mixer 105 receives the clean maize kernel, as indicated by arrow 390, receives the lime solution containing the water and lime, as indicated by arrow 395, limes the received clean maize kernel by mixing the received clean maize kernel with the received lime solution, and discharges the mixture, as indicated by arrow 400. In some embodiments, the mixture of the received clean maize kernel and the received lime solution contains 0.1-0.3% by weight lime to maize kernel.

The conditioner 110 receives the mixture discharged from the mixer 105, as indicated by the arrow 400, tempers the mixture causing additional moisture absorption, and discharges the tempered mixture, as indicated by arrow 405. In some embodiments, as in FIG. 5, water is added to the mixture discharged from the mixer 105, as indicated by arrow 410, before, during, or after the discharged mixture is received by the conditioner 110.

The blower 115 blows clean air to the boiler 120, as indicated by arrows 415 and 420, which boiler 120, in turn, receives water, as indicated by arrow 425, receives the clean air from the blower 115, as indicated by the arrow 420, receives fuel (e.g., natural gas), as indicated by arrow 430, boils the received water by burning the received fuel and clean air, vents exhaust from the burnt fuel, as indicated by arrow 435, and discharges steam produced by the boiled water, as indicated by arrow 440.

The steamer 125 receives the tempered mixture discharged from the conditioner 110, as indicated by the arrow 405, receives the steam discharged from the boiler 120, as indicated by the arrow 440, precooks the received mixture with the received steam, and discharges the precooked mixture, as indicated by arrow 445.

The quencher 130 receives the precooked mixture discharged from the steamer 125, as indicated by the arrow 445, tempers the precooked mixture causing cooling and additional moisture absorption, and discharges the tempered mixture, as indicated by arrow 450. In some embodiments, as in FIG. 5, water is added to the precooked mixture discharged from the steamer 125, as indicated by arrow 455, before, during, or after the precooked mixture is received by the quencher 130.

The crusher 375 receives the tempered mixture discharged from the quencher 130, as indicated by the arrow 450, crushes the tempered mixture into a coarse-ground kernel portion and a hull (or pericarp) portion, and discharges the coarse-ground kernel portion and the hull portion, as indicated by arrow 460. In some embodiments, the crusher 375 includes a feeder adapted to receive the tempered mixture discharged from the quencher 130. In some embodiments, the crusher 375 is a gravity-fed attrition mill (e.g., a jaw or rotary crusher). In some embodiments, a stone gap in the crusher 375 measures from 3,000 microns to 4,000 microns.

The separator 380 receives the coarse-ground kernel portion and the hull portion discharged from the separator 380, as indicated by the arrow 460, separates the coarse-ground kernel portion from the hull portion, and discharges the separated coarse-ground kernel portion, as indicated by arrow 465, and the separated hull portion, as indicated by arrow 470. In some embodiments, the separator 380 at least partially separates the coarse-ground kernel portion from the hull portion by receiving clean air (e.g., discharged from the blower 115), as indicated by arrow 475, aspirating the received hull portion with the received clean air, and venting the aspirated air from the hull portion, as indicated by arrow 480. In addition, or instead, the separator 380 may include a sieve adapted to at least partially separate the coarse-ground kernel portion from the hull portion.

The mill 385 receives the separated coarse-ground kernel portion discharged from the separator 380, as indicated by the arrow 465, grinds the separated coarse-ground kernel portion into dough materials, and discharges the dough materials, as indicated by arrow 485. In some embodiments, the mill 385 includes a feeder adapted to receive the separated coarse-ground kernel portion discharged from the separator 380. In some embodiments, as in FIG. 5, water is added to the separated coarse-ground kernel portion discharged from the separator 380, as indicated by arrow 486, before, during, or after the separated coarse-ground kernel portion is received by the mill 385. In some embodiments, the mill 385 is a gravity-fed attrition mill (e.g., a stone mill or gap mill). In some embodiments, a stone gap in the mill 385 measures from 300 microns to 1,500 microns.

The cooler 145 receives the dough materials from the mill 385, as indicated by the arrow 485, receives clean air (e.g., discharged from the blower 115), as indicated by arrow 490, cools the received dough materials with the received clean air, and discharges the cooled dough materials, as indicated by arrow 495. In some embodiments, the cooler 145 includes a band conveyer adapted to receive the dough materials discharged from the mill 385.

The kneader 150 receives the cooled dough materials discharged from the cooler 145, as indicated by the arrow 495, mixes the cooled dough materials into a lime-cooked masa, and discharges the lime-cooked masa, as indicated by arrow 500.

The sheet cutter 155 receives the lime-cooked masa from the kneader 150, as indicated by the arrow 500, forms the lime-cooked masa into sheets, cuts individual pieces from the sheets, and discharges the individual pieces, as indicated by arrow 505.

The oven 160 receives the individual pieces discharged from the sheet cutter 155, as indicated by the arrow 505, bakes the received individual pieces, and discharges the baked individual pieces, as indicated by arrow 510.

The homogenizer cooler 165 receives the baked individual pieces discharged from the oven, as indicated by the arrow 510, homogenizes moisture and cools the baked individual pieces, and discharges the cooled individual pieces, as indicated by arrow 515.

In some embodiments, the packer 175 receives the cooled individual pieces discharged from the homogenizer cooler 165, as indicated by the arrow 515, packages the cooled individual pieces in snack- or tortilla-sized portions, and discharges the packaged portions, as indicate by arrows 520a and/or 520b. In addition, or instead, the toaster/fryer 170 may receive at least a portion of the cooled individual pieces discharged from the homogenizer cooler 165, as indicated by arrow 525, fry the cooled individual pieces, cool the individual pieces again in the cooling section of the toaster/fryer 170, and discharge the fried individual pieces, as indicated by arrow 530. In such instances, the packer 175 receives the fried individual pieces discharged from the toaster/fryer 170, as indicated by the arrow 530, packages the fried individual pieces in snack- or tortilla-sized portions, and discharges the packaged portions, as indicated by the arrows 520a and/or 520b.

Figure 6:
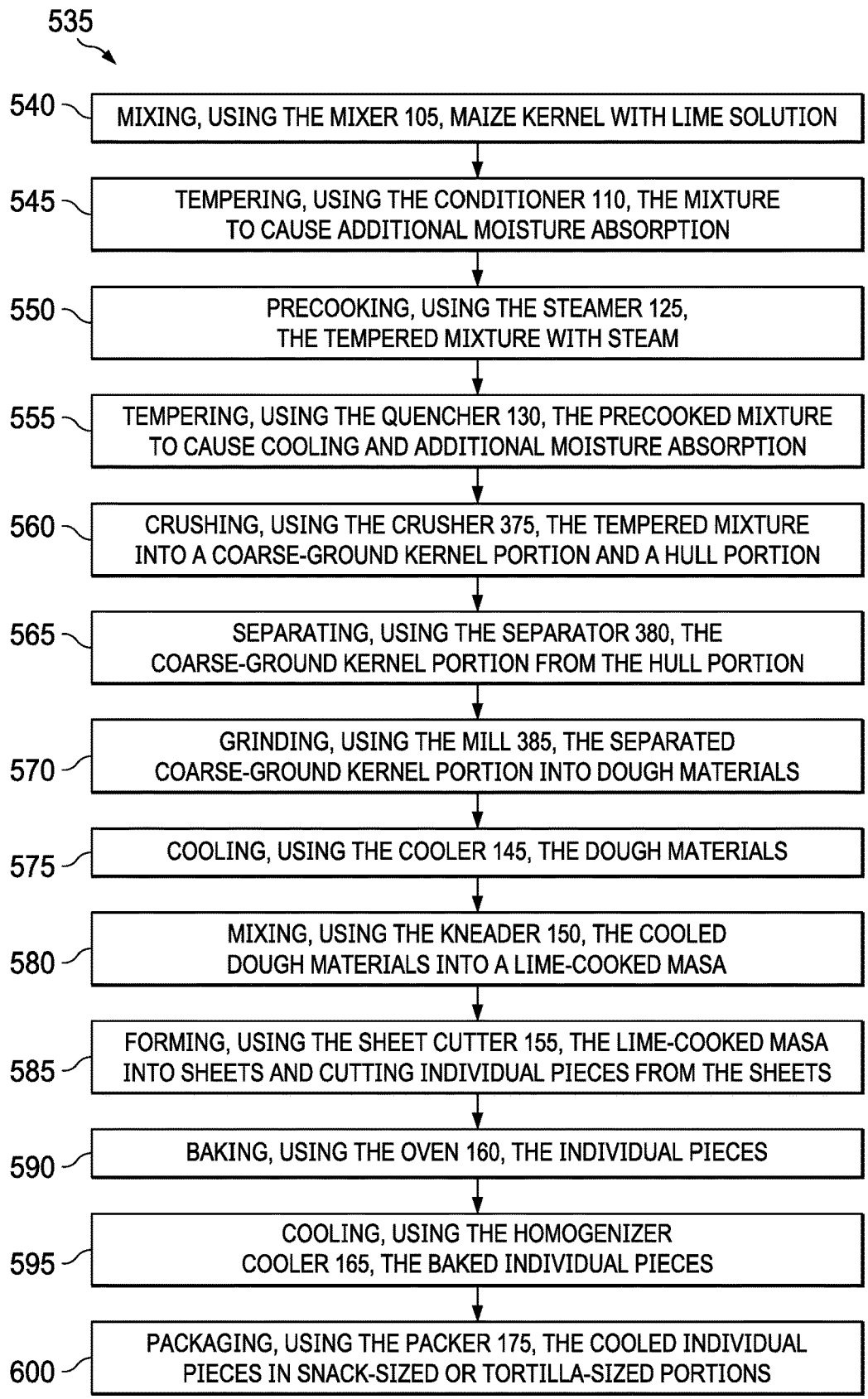
FIG. 6 is a flow diagram of a method of making lime-cooked masa using the system of FIG. 5, according to one or more embodiments of the present disclosure.

In an embodiment, as illustrated in FIG. 6, a method of making lime-cooked masa using the system 100 is generally referred to by the reference numeral 535. The method 535 includes at a step 540, mixing, using the mixer 105, maize kernel with lime solution to lime the maize kernel. In some embodiments, the mixture contains 0.1-0.3% by weight lime to maize kernel. In some embodiments, the maize kernel is dry-cleaned prior to mixing with the lime solution. The maize kernel may be a maize grain such as, for example, *Zea Mays* subspecies *Parviglumis* or *Mexicana* (e.g., white maize, yellow maize, blue maize, quality-protein maize, waxy maize, and/or high-amylose maize) or another cereal grain. The lime solution may contain 1% to 5% lime by weight; for example, the lime solution may contain 2% to 3% lime by weight. The cleaned maize kernel is thoroughly sprayed with the lime solution for 5 to 10 minutes to uniformly wet the kernel surface. In some embodiments, a solid to water ratio from 1:0.04 to 1:0.07 is maintained in the mixer 105 during the step 540. As a result, the moisture content of the maize kernel is adjusted from 12% or 13% to 17% or 18% during the step 540.

At a step 545, the conditioner 110 tempers the mixture to cause additional moisture absorption. In some embodiments, the mixture is tempered for 20 to 40 minutes at temperatures from 25° C. to 30° C. Water is added to the mixture before and/or during the tempering of the mixture by the conditioner 110. More particularly, in some embodiments, a solid to water ratio from 1:0.10 to 1:0.18 is maintained in the conditioner 110 during the step 545. As a result, the moisture content of the maize kernel is adjusted to 25% to 30% during the step 545; for example, the moisture content of the maize kernel may be adjusted to 28% to 30%.

At a step 550, the steamer 125 precooks the tempered mixture with steam (e.g., saturated steam). In some embodiments, the tempered mixture is precooked for 5 to 10 minutes at temperatures from 80° C. to 95° C. and at steam pressures from 90 kPa to 110 kPa (or 13.1-16.0 psi); for example, the tempered mixture may be precooked at a steam pressure of 101 kPa (or 14.7 psi) for a desired time to control temperature. As a result, the tempered mixture is heated and rehydrated (i.e., from steam condensate), and the moisture content of the maize kernel is adjusted to 30% to 42%; for example, the moisture content of the maize kernel may be adjusted to 32% to 38%; for another example, the moisture content of the maize kernel may be adjusted to 34% to 36%. In some embodiments, execution of the step 550 causes hydrolysis of the external-most layers of the maize kernel (i.e., the pericarp, the tip cap, and the aleurone) and partial hydrolysis or gelatinization of the internal-most layers of the maize kernel (i.e., the endosperm and the germ). As a result, the bran (i.e., the pericarp and the tip cap) is preserved so that the calcium bound in the resulting lime-cooked masa is increased for human nutrition (as compared to nixtamal masa and whole maize).

At a step 555, the quencher 130 tempers the precooked mixture to cause cooling and additional moisture absorption through the bran (i.e., the pericarp and tip cap). In some embodiments, the precooked mixture is tempered for 30 to 60 minutes at temperatures from 65° C. to 80° C. Water is added to the precooked mixture before and/or during tempering of the precooked mixture by the quencher 130. More particularly, in some embodiments, a solid to water ratio from 1:0.11 to 1:0.16 is maintained in the quencher 130 during the step 555. As a result, the moisture content of the maize kernel is adjusted to 35% to 47% during the step 555; for example, the moisture content of the maize kernel may be adjusted to 39% to 41%. Once tempered, the kernel is hard enough to be milled more efficiently than higher moisture and more elastic grains, while maintaining sufficient elasticity to avoid overheating during milling (which can cause starch damage in masa products).

At a step 560, the crusher 375 crushes the tempered mixture into a coarse-ground kernel portion and a hull portion.

At a step 565, the separator 380 separates the coarse-ground kernel portion from the hull portion. In some embodiments, the separated hull portion makes up between 5% to 6% by weight of the coarse-ground kernel portion and the hull portion, taken together.

At a step 570, the mill 385 grinds the separated coarse-ground kernel portion into dough materials. Water is added to the separated coarse-ground kernel portion before and/or during the grinding of the separated coarse-ground kernel portion by the mill 385. More particularly, in some embodiments, a solid to water ratio from 1:0.14 to 1:0.20 is maintained in the mill 385 during the step 570. As a result, the moisture content of the maize kernel is adjusted to 40% to 52% during the step 570; for example, the moisture content of the maize kernel may be adjusted to 44% to 46%. In addition, the added water cools the grinding stones of the mill 385 to temperatures from 45° C. to 60° C. During the step 570, the mill 385 grinds and abrades the coarse-ground kernel portion into a coarse-ground (larger-sized) fraction and a fine-ground (smaller-sized) fraction. The coarse-ground fraction (e.g., 14-35 mesh) may be used to produce snacks. The fine-ground fraction (e.g., 45-100 mesh) may be used to produce lime-cooked tortilla. Bimodal particle size distribution of the coarse-ground and fine-ground fractions is directly related to the size of the stone gap in the mill 385, the pressure between the respective rotor and stator stones of the mill 385, and/or the relative surface velocities of the respective rotor and stator stones of the mill 385. In addition, or instead, the bimodal particle size distribution of the coarse-ground and fine-ground fractions may be directly related to the size of the stone gap in the crusher 375, the pressure between the respective rotor and stator stones of the crusher 375, and/or the relative surface velocities of the respective rotor and stator stones of the crusher 375.

At a step 575, the cooler 145 cools the fine-ground and coarse-ground fractions with clean air (e.g., supplied from the blower 115). In some embodiments, the dough materials are cooled for 5 minutes. As a result, the moisture content of the dough materials is adjusted to 38% to 50% during the step 575; for example, the moisture content of the dough materials may be adjusted to 42% to 45%.

At a step 580, the kneader 150 mixes the cooled dough materials together to form a lime-cooked masa. In some embodiments, the lime-cooked masa is uniformly mixed, plastic (elastic), and cohesive (viscous).

At a step 585, the sheet cutter 155 forms the lime-cooked masa into sheets and cuts individual pieces (e.g., disk- or triangular-shaped) from the sheets. In some embodiments, the sheets are cut into the individual pieces by a rotating cutter.

At a step 590, the oven 160 bakes the individual pieces. In some embodiments, the individual pieces are baked for 20 to 40 seconds at temperatures from 280° C. to 300° C.

At a step 595, the homogenizer cooler 165 cools the baked individual pieces (e.g., with clean air to homogenize and balance moisture).

At a step 600, the packer 175 packages the cooled individual pieces in snack- or tortilla-sized portions. In some embodiments, the cooled moisture equilibrated individual pieces are packaged in the tortilla-sized portions with a moisture content 40% to 50%. In other embodiments, the toaster/fryer 170 fries the cooled moisture equilibrated individual pieces and then cools the hot fried individual pieces before the packer 175 packages the fried individual pieces in the snack-sized portions. For example, the moisture equilibrated cooled individual pieces may be fried (e.g., in vegetable oil) for 50 to 80 seconds at temperatures from 170° C. to 190° C. The hot fried individual pieces are then cooled in the cooling section of the toaster/fryer 170, and then are packaged (e.g., laminated in plastic bags) in the snack-sized portions (e.g., as whole snacks) with a moisture content of less than 1.5%.

Turning to FIG. 7, a table showing nutritional average compositions for lime-cooked masa prepared by the method 535 ("LCM2"), nixtamal masa ("NM"), and whole maize ("WM") is illustrated; composition values shown in the table are based on a moisture content of 10%. The LCM2 and the NM each include a network of solubilized starch and non-starch polymers (continuous phase) supporting dispersed, uncooked, and swollen protein-starch granules, fiber cell fragments, and lipids (dispersed phase). Both the LCM2 and the NM contain particles from the endosperm and the germ; however, the LCM2 and the NM contain different content from the bran (i.e., the pericarp and the tip cap). Consequently, as shown in FIG. 7, the LCM2 contains 8.5% dietary fiber and 0.1% calcium. Moreover, the LCM2 has, on average, a higher nutritional value as compared to the NM, with more protein (at ~9%), ~25% more fat, and ~25% more resistant starch.

In some embodiments, due to the inclusion of, or similarities to, other minimal processing techniques in the production of the LCM2 (e.g., cracking, crushing, rolling, lightly pearling, and/or steaming), the LCM2 is considered "whole grain". Other benefits associated with the LCM2 include, but are not limited to, organoleptic benefits (e.g., improved flavor and texture for tortillas) and other nutritional benefits (e.g., unbound niacin for pellagra prevention, bound calcium for osteoporosis, etc.). For example, the functional gum-like dispersion of the LCM2 (from 0.2% to 0.3% acidic soluble fiber) may impart not only a high water-binding capacity and viscosity, but also yields a biofunctional treatment for osteoporosis. Moreover, the LCM2 has improved tortilla texture and higher calcium availability (associated with bran acidic groups).

Turning to FIG. 8, a table showing the physico-chemical content of the LCM2 (i.e., prepared by the method 535), the NM, and the WM (i.e., dry-milled dough) is illustrated. On a percentage-by-weight basis, both the LCM2 and the NM have bimodal distributions containing a smaller- and a larger-sized group of particles as described by their modes. More particularly, the LCM2 yields a larger-sized mode (i.e., 25 mesh or 710 microns with 13% weight) and a smaller-sized mode (i.e., 60 mesh or 250 microns and 35% weight) appropriate for tortilla and snack making. The NM also yields a larger-sized mode (i.e., 35 mesh or 500 microns and 30% weight) and a smaller-sized mode (i.e., 80 mesh or 180 microns and 20% weight). However, as compared to the NM dough (at ~60%), the LCM2 dough has a lower weight fraction (~30%) above 45 mesh or 355 microns. The difference in size and weight between the larger-sized mode of the LCM2 and the larger-sized mode of the NM causes the apparent peak viscosity of the LCM2 (~3,000 centipoise) (at 95° C.) to be lower than the apparent peak viscosity of the NM (~3,470 centipoise). This difference in apparent peak viscosity may be (at least partially) attributable to: free starch particles increasing the viscosity of the NM during pasting (i.e., at 14% solids content); and slower water diffusion into, and swelling of, the LCM2's coarser particles. Finally, the WM contains smaller and finer particles (i.e., 355 microns) than both the LCM2 and the NM; as a result, the WM has an even higher apparent peak viscosity (~5,600 centipoise). After two separate heating-cooling processes (i.e., steamer 125-quencher 130 and mill 385-cooler 145), a partial gelatinization of the starchy endosperm induces resistant starch (RS3) formation (at 2.5%) along with particle-size aggregation but does not destroy granule structure.

Figure 9:
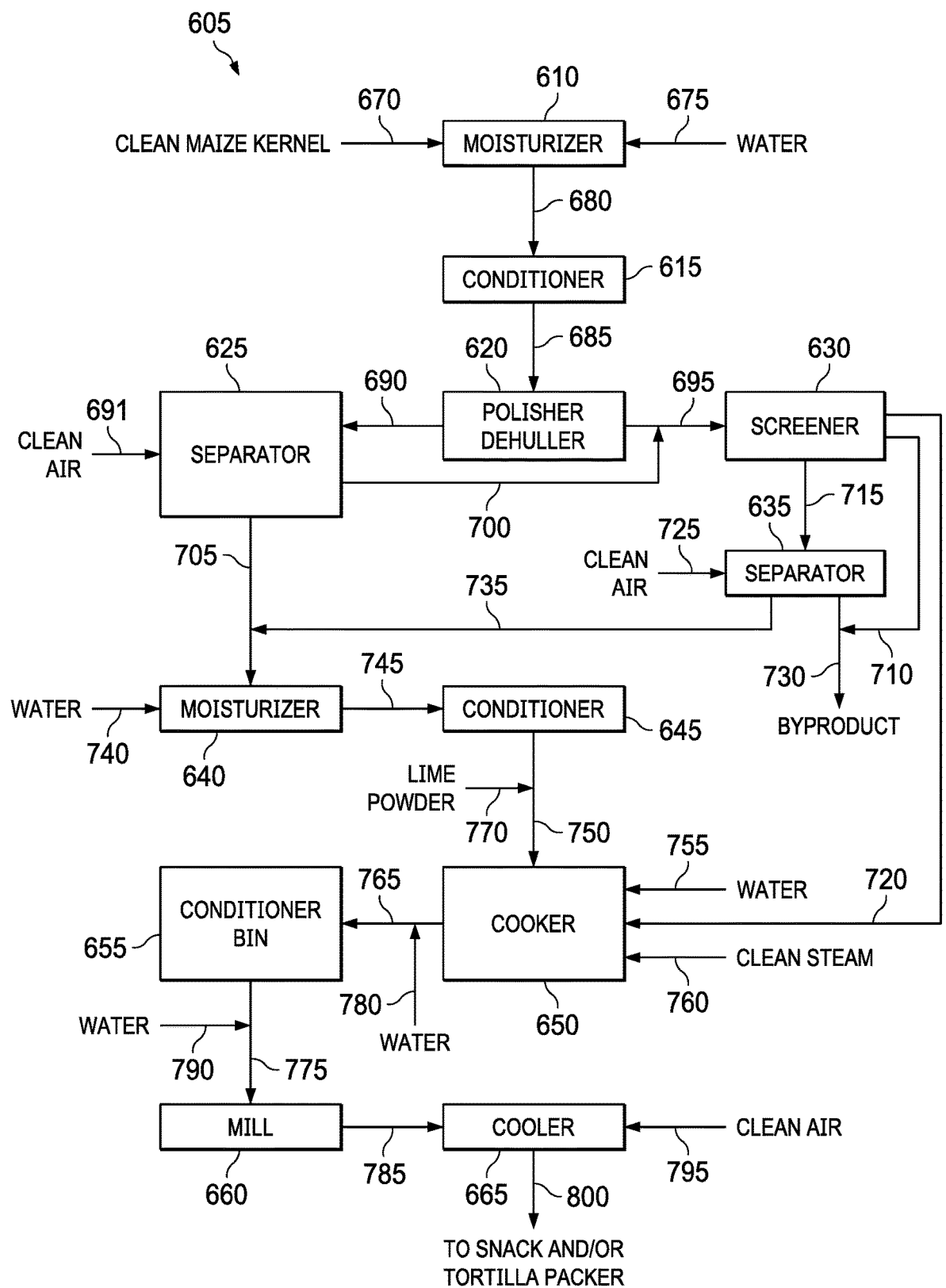
FIG. 9 is a diagrammatic illustration of yet another system adapted to make lime-cooked masa, according to one or more embodiments of the present disclosure.

In an embodiment, as illustrated in FIG. 9, yet another system adapted to make lime-cooked masa is generally referred to by the reference numeral 605. The system 605 includes a moisturizer 610, a conditioner 615, a polisher/dehuller 620, a separator 625, a screener 630, a separator 635, a moisturizer 640, a conditioner 645, a cooker 650, a conditioner such as, for example, a conditioner bin 655, a mill 660, and a cooler 665. As shown in FIG. 9, the conditioner 615 is operably coupled to the moisturizer 610. The polisher/dehuller 620 is operably coupled to the conditioner 615. The separator 625 is operably coupled to the polisher/dehuller 620. The screener 630 is also operably coupled to the polisher/dehuller 620. The separator 635 is operably coupled to the screener 630. The moisturizer 640 is operably coupled to each of the separator 625 and the separator 635. The conditioner 645 is operably coupled to the moisturizer 640. The cooker 650 is operably coupled to each of the conditioner 645 and the screener 630. The conditioner bin 655 is operably coupled to the cooker 650. The mill 660 is operably coupled to the conditioner bin 655. The cooler 665 is operably coupled to the mill 660.

In operation, with continuing reference to FIG. 9, the moisturizer 610 receives clean maize kernel, as indicated by arrow 670, receives water, as indicated by arrow 675, moisturizes the received clean maize kernel with the received water, and discharges the moisturized maize kernel, as indicated by arrow 680. The clean maize kernel includes endosperm, germ, pericarp, and tip cap components.

The conditioner 615 receives the moisturized maize kernel discharged from the moisturizer 610, as indicated by the arrow 680, tempers the moisturized maize kernel, and discharges the tempered maize kernel, as indicated by arrow 685. In some embodiments, the conditioner 615 includes a feeder adapted to receive the moisturized maize kernel discharged from the moisturizer 610.

The polisher/dehuller 620 receives the tempered maize kernel discharged from the conditioner 615, as indicated by the arrow 685, at least partially breaks and at least partially loosens the pericarp of the tempered maize kernel, discharges a coarse maize fraction including most of the pericarp, as indicated by arrow 690, and discharges a fine maize fraction, as indicated by arrow 695. In some embodiments, the polisher/dehuller 620 includes a feeder adapted to receive the tempered mixture from the conditioner 615.

The separator 625 receives the coarse maize fraction discharged from the polisher/dehuller 620, as indicated by the arrow 690, receives clean air, as indicated by arrow 691, removes the pericarp component from the coarse maize fraction using the clean air, discharges the pericarp component, as indicated by arrow 700, and discharges the purified coarse maize fraction, as indicated by arrow 705. In some embodiments, the separator 625 is or includes an air separator. In some embodiments, in addition, or instead, the separator 625 is or includes another type of separator.

The screener 630 receives the fine maize fraction discharged from the polisher/dehuller 620, as indicated by the arrow 695, receives the pericarp component discharged from the separator 625, as indicated by the arrow 700, screens the received maize particles to yield first, second, and third streams, discharges the first stream as a byproduct, as indicated by arrow 710, discharges the second stream, as indicated by arrow 715, and discharges the third stream, as indicated by arrow 720. The first stream includes large size pericarp. The second stream includes residual fines, the tip cap component, and small size or fine pericarp. The third stream includes purified fines.

The separator 635 receives the second stream discharged from the screener 630, as indicated by the arrow 715, receives clean air, as indicated by arrow 725, removes the residual fines and small size or fine pericarp components from the second stream using the clean air, discharges the removed residual fines and small size or fine pericarp components as a byproduct, as indicated by arrow 730, and discharges the purified second stream, which includes the tip cap component, as indicated by arrow 735.

The moisturizer 640 receives the purified coarse maize fraction discharged from the separator 625, as indicated by the arrow 705, receives the purified second stream discharged from the separator 635, as indicated by the arrow 735, receives water, as indicated by arrow 740, moisturizes the received maize particles with the received water, and discharges the moisturized maize particles, as indicated by arrow 745.

The conditioner 645 receives the moisturized maize particles discharged from the moisturizer 640, as indicated by the arrow 745, tempers the moisturized maize particles, and discharges the tempered maize particles, as indicated by arrow 750.

The cooker 650 receives the third stream discharged from the screener 630, as indicated by the arrow 720, receives the tempered maize particles discharged from the conditioner 645, as indicated by the arrow 750, receives water, as indicated by arrow 755, receives clean steam, as indicated by arrow 760, cooks the received maize particles with the received water and clean steam, and discharges the cooked maize particles, as indicated by arrow 765. In some embodiments, as shown in FIG. 9, the maize kernel, in the form of tempered maize particles discharged from the conditioner 645, is limed by adding lime to the tempered maize particles discharged from the conditioner 645, as indicated by arrow 770, before, during, or after the discharged tempered maize particles are received by the cooker 650; in some embodiments, the maize particles are limed by adding lime powder in a range of 0.1% to 0.3% based on maize kernel; in some embodiments, the maize particles are limed before they are received by the cooker 650; in some embodiments, before the maize particles are received by the cooker 650, the maize particles are limed by adding lime powder in a range of 0.1% to 0.3% based on maize kernel. In some embodiments, the cooker 650 steams the received maize particles, the received lime, and the received water to an absolute pressure of at least, for example, 90 kPa.

The conditioner bin 655 receives the cooked maize particles discharged from the cooker 650, as indicated by the arrow 765, tempers the cooked maize particles, and discharges the tempered maize particles, as indicated by arrow 775. In some embodiments, as in FIG. 9, water is added to the cooked maize particles discharged from the cooker 650, as indicated by arrow 780, before, during, or after the discharged cooked maize particles are received by the conditioner bin 655; the added water lowers the temperature of the cooked maize particles.

The mill 660 receives the tempered maize particles from the conditioner bin 655, as indicated by the arrow 775, mills the tempered maize particles into lime-cooked masa, and discharges the lime-cooked masa, as indicated by arrow 785. In some embodiments, as in FIG. 9, water is added to the tempered maize particles discharged from the conditioner bin 655, as indicated by arrow 790, before, during, or after the discharged tempered maize particles are received by the mill 660. In some embodiments, the mill 660 is or includes a stone mill having milling stone(s) that are adjustable to various gap widths depending upon the desired characteristics of the lime-cooked masa.

The cooler 665 receives the lime-cooked masa discharged from the mill 660, as indicated by the arrow 785, receives clean air, as indicated by arrow 795, cools the lime-cooked masa with the clean air, and discharges the cooled lime-cooked masa, as indicated by arrow 800. The discharged lime-cooked masa can then be used in the manufacture of food products such as, for example, snacks (e.g., chips) and tortillas.

Figure 10:
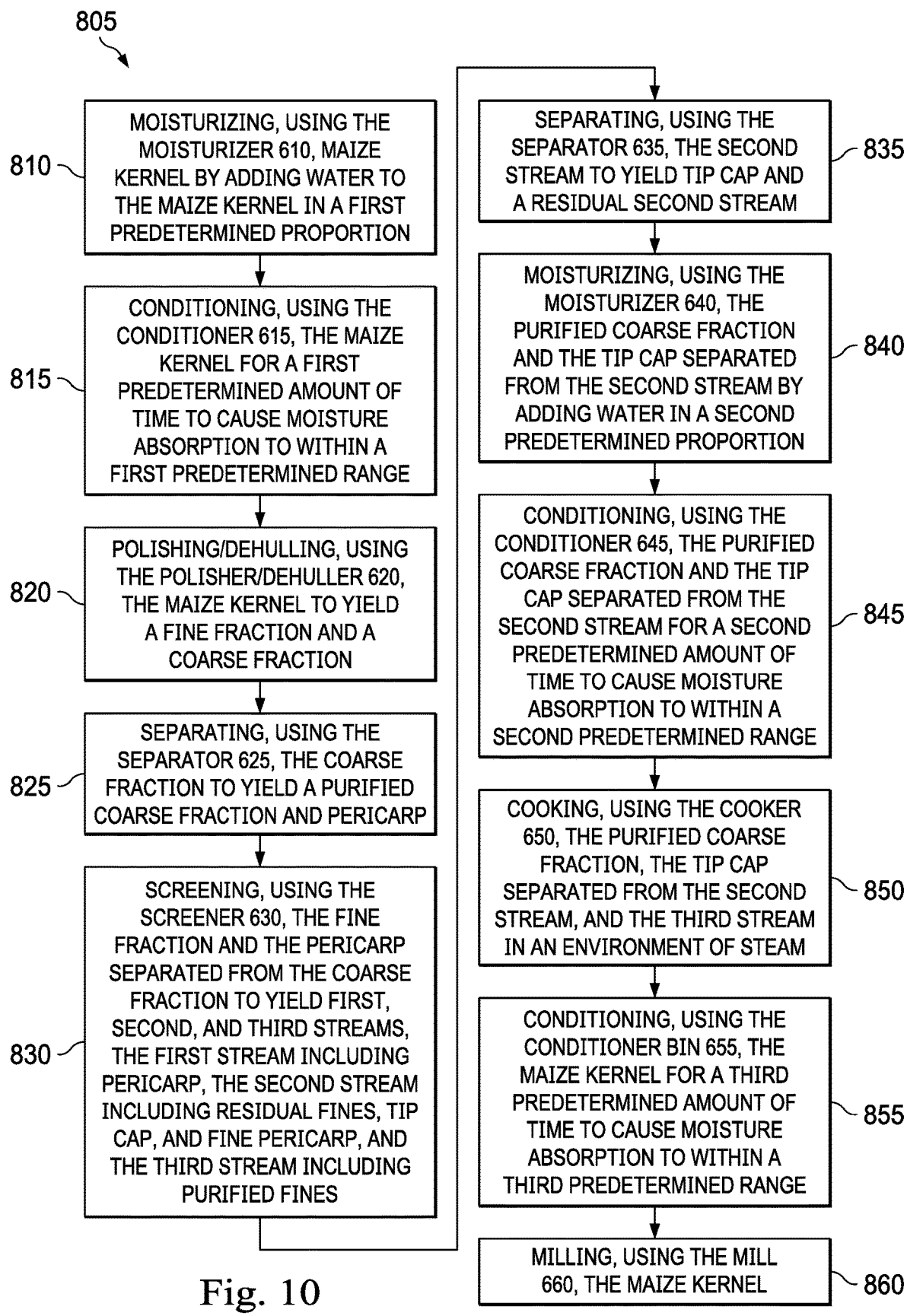
FIG. 10 is a flow diagram of a method of making lime-cooked masa using the system of FIG. 9, according to one or more embodiments of the present disclosure.

In an embodiment, as illustrated in FIG. 10, a method of making lime-cooked masa ("LCM3") using the system 605 is generally referred to by the reference numeral 805. In some embodiments, execution of the method 805 results in: water consumption of from 0.52 to 0.60 parts water per one part maize kernel by weight for chip production and 0.76 parts water per one part maize kernel by weight for tortilla production; negligible wastewater discharge; negligible solid waste; energy consumption of less than 0.5 gigajoule (GJ)/ton of the provided maize kernel for chip production; or any combination thereof. In an embodiment, as illustrated in FIG. 10, a method of making lime-cooked masa ("LCM3") using the system 605 is generally referred to by the reference numeral 805. In some embodiments, execution of the method 805 results in: water consumption of no more than 0.60 parts water per one part maize kernel by weight for chip production; no more than 0.76 parts water per one part maize kernel by weight for tortilla production; negligible wastewater discharge; negligible solid waste; energy consumption of less than 0.5 gigajoule (GJ)/ton of the provided maize kernel for chip production; or any combination thereof. The method 805 includes at a step 810, moisturizing, using the moisturizer 610, maize kernel by adding water to the maize kernel in a first predetermined proportion, the maize kernel having endosperm, germ, pericarp, and tip cap components. In some embodiments of the step 810, the first predetermined proportion ranges from 0.07 to 0.12 parts water for every 1 part of solids (i.e., maize kernel).

At a step 815, the maize kernel is conditioned, using the conditioner 615, for a first predetermined amount of time to cause moisture absorption to within a first predetermined range. In some embodiments of the step 815, the first predetermined amount of time is at least 10 minutes. In some embodiments of the step 815, the first predetermined range is from 17% to 21%.

At a step 820, the maize kernel is polished/dehulled, using the polisher/dehuller 620, to yield a fine fraction and a coarse fraction.

At a step 825, the coarse fraction is separated, using the separator 625, to yield a purified coarse fraction and pericarp.

At a step 830, the fine fraction and the pericarp separated from the coarse fraction are screened, using the screener 630, to yield first, second, and third streams, the first stream including pericarp, the second stream including residual fines, tip cap, and fine pericarp, and the third stream including purified fines.

At a step 835, the second stream is separated, using the separator 635, to yield tip cap and a residual second stream.

At a step 840, the purified coarse fraction and the tip cap separated from the second stream are moisturized, using the moisturizer 640, by adding water in a second predetermined proportion. In some embodiments of the step 840, the second predetermined proportion ranges from 0.2 to 0.26 parts water for every 1 part of solids.

At a step 845, the purified coarse fraction and the tip cap separated from the second stream are conditioned, using the conditioner 645, for a second predetermined amount of time to cause moisture absorption to within a second predetermined range. In some embodiments of the step 845, the second predetermined amount of time is at least 3 hours. In some embodiments of the step 845, the second predetermined moisture range is from 30% to 34%.

At a step 850, the purified coarse fraction, the tip cap separated from the second stream, and the third stream are cooked, using the cooker 650, in an environment of steam. In some embodiments, before or during the step 850, the maize particles are limed by adding lime powder in a range of 0.1% to 0.3% based on maize kernel. In some embodiments, before or during the step 850, the maize particles are moisturized by adding water in a proportion ranging from 0.20 to 0.26 parts water for every 1 part of solids. In some embodiments of the step 850, the maize particles are steamed and hydrated to an absolute pressure of at least 90 kPa for an amount of time ranging from 4 minutes to 12 minutes. During this time, the cooker 650 reaches a temperature from 72° C. to 96° C.; as a result, the cooked maize particles reach a moisture content from 42% to 51% and a temperature from 71° C. to 89° C.

At a step 855, the maize kernel is conditioned, using the conditioner bin 655, for a third predetermined amount of time to cause moisture absorption to within a third predetermined range. In some embodiments of the step 855, the third predetermined amount of time ranges from at least 3 hours to 4 hours. In some embodiments, before or during the step 855, water is added to the maize kernel in a third predetermined proportion; for example, the third predetermined proportion may range from 0.1 to 0.2 parts water for every 1 part of solids. In some embodiments, execution of the step 855 lowers the temperature of the maize particles to between 60° C. and 70° C. In some embodiments, execution of the step 855 results in the cooked maize particles reaching a moisture content from 43% to 53%.

At a step 860, the maize kernel is milled using the mill 660. In some embodiments, before or during the step 860, the method 805 further includes adding water to the maize kernel in a fourth predetermined proportion; for example, the fourth predetermined proportion may range from 0.01 to 0.05 parts water for every 1 part of solids. In some embodiments, after the step 860, the method 805 further includes cooling, using the cooler 665, the milled maize kernel. In some embodiments, execution of the step 860 causes the maize particles to reach a temperature of between 55° C. and 72° C. The cooler 665 may subsequently be utilized to cool the maize particles to a temperature of between 25° C. and 35° C.

Referring to FIG. 11, a table comparing water and energy consumption between traditional masa production and lime-cooked masa prepared using one embodiment of a system of the present disclosure (e.g., LCM1 prepared using the system 100, LCM2 prepared using the system 370, or LCM3 prepared using the system 605), and/or using one embodiment of a method of the present disclosure (e.g., LCM1 prepared by the method 305, LCM2 prepared by the method 535, or LCM3 prepared by the method 805) is illustrated. As shown in FIG. 11, it is possible to manufacture lime-cooked masa with steam heating and without wastewater (or very little wastewater, or negligible amounts of wastewater), and with negligible solid waste, which is more energy and water efficient, wherein some of the nutrient, water and energy losses that would have been present but for the features of the present method(s) are prevented. In some embodiments, the steps of the method(s) 305, 535, and/or 805 are: continuously and repeatedly performed; continuously and repeatedly performed for a predetermined amount of time; and/or continuously and repeatedly performed over a time period. In some embodiments, the operation of the system 100, 370, or 605, and/or the execution of the method 305, 535, or 805: saves water usage; eliminates wastewater discharge; results in very little wastewater discharge; results in negligible wastewater discharge; results in savings of 91% to 93% in water consumption (e.g., to between 4.5 and 5.5 cubic meters of water per ton of maize kernel) as compared to a traditional NM wet-mill; results in savings of 20% to 40% in energy consumption (e.g., to between 0.1 and 0.2 MMBTU/ton of maize kernel) as compared to a traditional NM wet-mill; and/or reduces carbon dioxide emission (e.g., to between 60 and 84 kg of $CO_2$/ton of maize kernel). In some embodiments, the term "ton" may refer to "metric ton," a unit of weight equal to 1,000 kg (about 2,200 lb).

Figure 12:
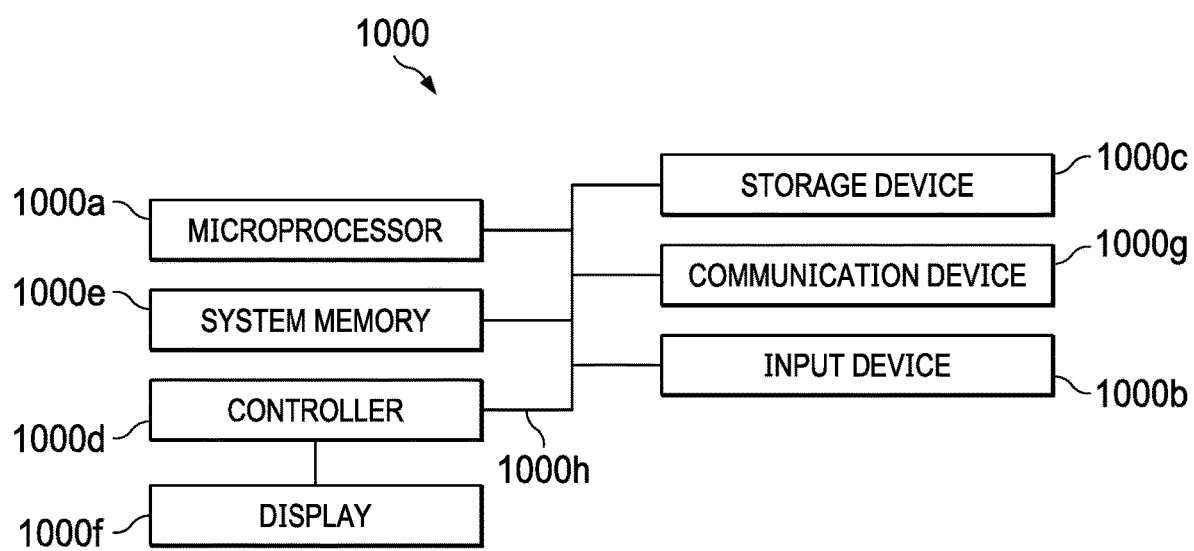
FIG. 12 is a diagrammatic illustration of a computing node for implementing one or more embodiments of the present disclosure.

Referring to FIG. 12, in an embodiment, a computing node 1000 for implementing one or more embodiments of one or more of the above-described elements, systems (e.g., 100, 370, and/or 605), methods (e.g., 305, 535, and/or 805) and/or steps (e.g., 310, 315, 320, 325, 330, 335, 340, 345, 350, 355, 360, 365, 540, 545, 550, 555, 560, 565, 570, 575, 580, 585, 590, 595, 600, 810, 815, 820, 825, 830, 835, 840, 845, 850, 855, and/or 860), or any combination thereof, is depicted. The node 1000 includes a processor or microprocessor 1000a, an input device 1000b, a storage device 1000c, a controller 1000d, a system memory 1000e, a display 1000f, and a communication device 1000g all interconnected by one or more buses 1000h. In several embodiments, the storage device 1000*c* may include a floppy drive, hard drive, CD-ROM, optical drive, any other form of storage device or any combination thereof. In several embodiments, the storage device 1000*c* may include, and/or be capable of receiving, a floppy disk, CD-ROM, DVD-ROM, or any other form of computer-readable medium that may contain executable instructions. In several embodiments, the communication device 1000*g* may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a non-transitory computer readable medium may be executed by one or more processors to cause the one or more processors to carry out or implement in whole or in part the above-described operation of each of the above-described elements, systems (e.g., 100, 370, and/or 605), methods (e.g., 305, 535, and/or 805), steps (e.g., 310, 315, 320, 325, 330, 335, 340, 345, 350, 355, 360, 365, 540, 545, 550, 555, 560, 565, 570, 575, 580, 585, 590, 595, 600, 810, 815, 820, 825, 830, 835, 840, 845, 850, 855, and/or 860), or any combination thereof. In several embodiments, such a processor may include one or more of the microprocessor 1000*a*, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions. In several embodiments, such a non-transitory computer readable medium may be part of one or more controllers; in several embodiments, the system 100, 370, or 605 may include such one or more controllers, in several embodiments, one or more components of the system 100, 370, or 605 may include such one or more controllers.

In some embodiments, objects and advantages of the present disclosure can be achieved through a continuous processing technique applied to the production of whole lime-cooked masa, in which heating and cooling steps increase the resistant starch, and the lime cooked hull yields a soluble fiber that can bind calcium. Embodiments of this process include providing a clean maize kernel by mixing and conditioning with lime solution, steaming the tempered kernel with saturated steam to effect a partial cooking without wastewater and reduced energy usage, conditioning and cooling the blanched kernel for efficient grinding, milling and adding water to the tempered kernel so as to produce a coarse-ground and fine-ground dough material in order to yield a wasteless lime-cooked masa, forming the masa into the desired product form, such as tortilla or snack, baking and cooling the food product, and packaging the tortilla, or further baking or frying the food for snack and maize-based foods.

In some embodiments, objects and advantages of the present disclosure can be achieved through a continuous processing technique applied to the production of partially whole lime-cooked masa, in which the hull is separated while leaving the tip cap. Embodiments of this process include providing a clean maize kernel by mixing and conditioning with lime solution, steaming the tempered kernel with saturated steam to effect a partial cooking without wastewater and reduced energy usage, conditioning and cooling the steamed kernel for efficient grinding, crushing the kernel, separating a hull fraction from the ground kernel, milling and adding water to the separated fraction so as to produce a coarse-ground and fine-ground dough material in order to yield a wasteless lime-cooked masa, forming the masa into the desired product form, such as tortilla or snack, baking and cooling the food product, and packaging the tortilla or further baking or frying the food for snack and maize-based foods.

The present disclosure introduces a method of making lime-cooked masa. The method generally includes: providing maize kernel having endosperm, germ, pericarp, and tip cap components; after providing the maize kernel, adding water to the maize kernel in a first predetermined proportion, and conditioning, using a first conditioner, the maize kernel for a first predetermined amount of time to cause moisture absorption to within a first predetermined range; liming the maize kernel; cooking, using a cooker, the maize kernel in an environment of steam; after cooking the maize kernel, adding water to the maize kernel in a second predetermined proportion, and conditioning, using a second conditioner, the maize kernel for a second predetermined amount of time to cause moisture absorption to within a second predetermined range; and milling, using one or more mills, the maize kernel.

The foregoing method embodiment may include one or more of the following elements, either alone or in combination with one another:

Execution of the method results in: water consumption of no more than 0.6 parts of water per one part of maize kernel by weight for chip production; water consumption of no more than 0.76 parts of water per one part of maize kernel by weight for tortilla production; negligible wastewater discharge; negligible solid waste; energy consumption of less than 0.5 GJ/ton of the provided maize kernel for chip production; or any combination thereof.

The method further includes: after milling the maize kernel, cooling, using a cooler, the milled maize kernel; and after cooling the milled maize kernel, kneading, using a kneader, the cooled milled maize kernel into the lime-cooked masa.

The method further includes: before or during milling the maize kernel, adding water to the maize kernel in a third predetermined proportion.

The method further includes: after conditioning the maize kernel for the first predetermined amount of time and before cooking the maize kernel, polishing/dehulling, using a polisher/dehuller, the maize kernel to yield a fine fraction and a coarse fraction, separating, using a first separator, the coarse fraction to yield a purified coarse fraction and pericarp, screening, using a screener, the fine fraction and the pericarp separated from the coarse fraction to yield first, second, and third streams, the first stream including pericarp, the second stream including residual fines, tip cap, and fine pericarp, and the third stream including purified fines, and separating, using a second separator, the second stream to yield tip cap and a residual second stream.

The method further includes: adding water to the purified coarse fraction and the tip cap separated from the second stream in a third predetermined proportion; and conditioning, using a third conditioner, the purified coarse fraction and the tip cap separated from the second stream for a third predetermined amount of time to cause moisture absorption to within a third predetermined range.

Cooking, using the cooker, the maize kernel in the environment of steam includes: after conditioning the purified coarse fraction and the tip cap separated from the second stream for the third predetermined amount of time, cooking, using the cooker, the purified coarse fraction, the tip cap separated from the second stream, and the third stream in the environment of steam; and liming the maize kernel includes: adding lime powder to the purified coarse fraction and the tip cap separated from the second stream.

The method further includes: after conditioning the maize kernel for the second predetermined amount of time and before milling the maize kernel, crushing, using a crusher, the maize kernel into coarse-ground kernel and pericarp, and separating, using a separator, the crushed maize kernel to yield the coarse-ground kernel and the pericarp.

Milling, using the one or more mills, the maize kernel includes: after separating the crushed maize kernel to yield the coarse-ground kernel and the pericarp, milling, using the one or more mills, the coarse-ground kernel.

Milling, using the one or more mills, the maize kernel includes: milling a first portion of the maize kernel with a first mill to yield fine-ground dough material; and milling a second portion of the maize kernel with a second mill to yield coarse-ground dough material.

The present disclosure also introduces a system adapted to make lime-cooked masa. The system generally includes: a first conditioner to which water and maize kernel are adapted to be provided in a first predetermined proportion, the maize kernel having endosperm, germ, pericarp, and tip cap components, wherein the first conditioner is adapted to condition the maize kernel for a first predetermined amount of time to cause moisture absorption to within a first predetermined range; a cooker adapted to cook the maize kernel together with lime in an environment of steam; a second conditioner to which water and the cooked maize kernel are adapted to be provided in a second predetermined proportion, wherein the second conditioner is adapted to condition the cooked maize kernel for a second predetermined amount of time to cause moisture absorption within a second predetermined range; and one or more mills adapted to mill the maize kernel.

The foregoing system embodiment may include one or more of the following elements, either alone or in combination with one another:

Using the system to make lime-cooked masa results in: water consumption of no more than 0.6 parts of water per one part of maize kernel by weight for chip production; water consumption of no more than 0.76 parts of water per one part of maize kernel by weight for tortilla production; negligible wastewater discharge; negligible solid waste; energy consumption of less than 0.5 GJ/ton of the provided maize kernel for chip production; or any combination thereof.

The system further includes: a cooler adapted to cool the milled maize kernel; and a kneader adapted to knead the cooled maize kernel into the lime-cooked masa.

Water and the maize kernel are adapted to be provided to the one or more mills in a third predetermined proportion.

The system further includes: a polisher/dehuller adapted to polish/dehull the maize kernel to yield a fine fraction and a coarse fraction; a first separator adapted to separate the coarse fraction to yield a purified coarse fraction and pericarp; a screener adapted to screen the fine fraction and the pericarp separated from the coarse fraction to yield first, second, and third streams, the first stream including pericarp, the second stream including residual fines, tip cap, and fine pericarp, and the third stream including purified fines; and a second separator adapted to separate the second stream to yield tip cap and a residual second stream.

Water, the purified coarse fraction, and the tip cap separated from the second stream are adapted to be provided to a third conditioner in a third predetermined proportion; and the system further includes the third conditioner adapted to condition the purified coarse fraction and the tip cap separated from the second stream for a third predetermined amount of time to cause moisture absorption to within a third predetermined range.

The cooker is adapted to cook the purified coarse fraction, the tip cap separated from the second stream, and the third stream in the environment of steam.

The system further includes: a crusher adapted to crush the maize kernel into coarse-ground kernel and pericarp; and a separator adapted to separate the crushed maize kernel to yield the coarse-ground kernel and the pericarp.

The one or more mills are adapted to mill the coarse-ground kernel.

The one or more mills include: a first mill adapted to mill a first portion of the maize kernel to yield fine-ground dough material; and a second mill adapted to mill a second portion of the maize kernel to yield coarse-ground dough material.

The present disclosure also introduces an apparatus, which generally includes: a non-transitory computer readable medium; and a plurality of instructions stored on the non-transitory computer readable medium, wherein the instructions are executed with one or more processors so that the following steps are executed: adding water to maize kernel in a first predetermined proportion, the maize kernel having endosperm, germ, pericarp, and tip cap components; conditioning, using a first conditioner, the maize kernel for a first predetermined amount of time to cause moisture absorption to within a first predetermined range; liming the maize kernel; cooking, using a cooker, the maize kernel in an environment of steam; after cooking the maize kernel, adding water to the maize kernel in a second predetermined proportion, and conditioning, using a second conditioner, the maize kernel for a second predetermined amount of time to cause moisture absorption to within a second predetermined range; and milling, using one or more mills, the maize kernel.

The foregoing apparatus embodiment may include one or more of the following elements, either alone or in combination with one another:

Execution of the instructions with the one or more processors results in: water consumption of no more than 0.6 parts of water per one part of maize kernel by weight for chip production; water consumption of no more than 0.76 parts of water per one part of maize kernel by weight for tortilla production; negligible wastewater discharge; negligible solid waste; energy consumption of less than 0.5 GJ/ton of the provided maize kernel for chip production; or any combination thereof.

The instructions are executed with the one or more processors so that the following additional steps are executed: after milling the maize kernel, cooling, using a cooler, the milled maize kernel; and after cooling the maize kernel, kneading, using a kneader, the cooled maize kernel into the lime-cooked masa.

The instructions are executed with the one or more processors so that the following additional step is executed: before or during milling the maize kernel, adding water to the maize kernel in a third predetermined proportion.

The instructions are executed with the one or more processors so that the following additional steps are executed: after conditioning the maize kernel for the first predetermined amount of time and before cooking the maize kernel, polishing/dehulling, using a polisher/dehuller, the maize kernel to yield a fine fraction and a coarse fraction, separating, using a first separator, the coarse fraction to yield a purified coarse fraction and pericarp, screening, using a screener, the fine fraction and the pericarp separated from the coarse fraction to yield first, second, and third streams, the first stream including pericarp, the second stream including residual fines, tip cap, and fine pericarp, and the third stream including purified fines, and separating, using a second separator, the second stream to yield tip cap and a residual second stream.

The instructions are executed with the one or more processors so that the following additional steps are executed: adding water to the purified coarse fraction and the tip cap separated from the second stream in a third predetermined proportion; and conditioning, using a third conditioner, the purified coarse fraction and the tip cap separated from the second stream for a third predetermined amount of time to cause moisture absorption to within a third predetermined range.

Cooking, using the cooker, the maize kernel in the environment of steam includes: after conditioning the purified coarse fraction and the tip cap separated from the second stream for the third predetermined amount of time, cooking, using the cooker, the purified coarse fraction, the tip cap separated from the second stream, and the third stream in the environment of steam; and liming the maize kernel includes: adding lime powder to the purified coarse fraction and the tip cap separated from the second stream.

The instructions are executed with the one or more processors so that the following additional steps are executed: after conditioning the maize kernel for the second predetermined amount of time and before milling the maize kernel, crushing, using a crusher, the maize kernel into coarse-ground kernel and pericarp, and separating, using a separator, the crushed maize kernel to yield the coarse-ground kernel and the pericarp.

Milling, using the one or more mills, the maize kernel includes: after separating the crushed maize kernel to yield the coarse-ground kernel and the pericarp, milling, using the one or more mills, the coarse-ground kernel.

Milling, using the one or more mills, the maize kernel includes: milling a first portion of the maize kernel with a first mill to yield fine-ground dough material; and milling a second portion of the maize kernel with a second mill to yield coarse-ground dough material.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. Moreover, it is the express intention of the applicant not to invoke 35 U.S.C. § 112, paragraph 6, for any limitations of any of the claims herein, except for those in which the claim expressly uses the word "means" together with an associated function.

What is claimed is:

1. A method, comprising:
    adding water to maize kernel in a first predetermined proportion, the maize kernel having endosperm, germ, pericarp, and tip cap;
    conditioning, using a first conditioner, the maize kernel for a first predetermined amount of time to cause moisture absorption to within a first predetermined range;
    after conditioning the maize kernel for the first predetermined amount of time,
        polishing/dehulling, using a polisher/dehuller, the maize kernel from the first conditioner to yield a fine fraction and a coarse fraction,
        separating, using a first separator, the coarse fraction from the polisher/dehuller to yield a purified coarse fraction and pericarp,
        screening, using a screener, both the fine fraction from the polisher/dehuller and the pericarp from the first separator to yield first, second, and third streams, the first stream including pericarp, the second stream including residual fines, tip cap, and fine pericarp, and the third stream including purified fines, and
        separating, using a second separator, the second stream from the screener to yield tip cap and a residual second stream;
    liming the purified coarse fraction from the first separator and the tip cap from the second separator;
    cooking, using a cooker, the purified coarse fraction from the first separator, the tip cap from the second separator, and the purified fines of the third stream from the screener in an environment of steam; and
    after cooking the purified coarse fraction from the first separator, the tip cap from the second separator, and the purified fines of the third stream from the screener:
        adding water to the purified coarse fraction, the tip cap, and the purified fines in a second predetermined proportion;
        conditioning, using a second conditioner, the purified coarse fraction, the tip cap, and the purified fines for a second predetermined amount of time to cause moisture absorption to within a second predetermined range; and
        milling, using one or more mills, the purified coarse fraction, the tip cap, and the purified fines.

2. The method of claim 1, further comprising:
    adding water to the purified coarse fraction and the tip cap in a third predetermined proportion; and
    conditioning, using a third conditioner, the purified coarse fraction and the tip cap for a third predetermined amount of time to cause moisture absorption to within a third predetermined range.

3. The method of claim 2, wherein the purified coarse fraction, the tip cap, and the purified fines are cooked in the environment of steam after the purified coarse fraction and the tip cap are conditioned for the third predetermined amount of time; and
    wherein liming the purified coarse fraction and the tip cap comprises adding lime powder to the purified coarse fraction and the tip cap.

4. The method of claim 1,
    further comprising: after milling the purified coarse fraction, the tip cap, and the purified fines, producing chips from the milled purified coarse fraction, the milled tip cap, and the milled purified fines.

5. The method of claim 1,
    further comprising: after milling the purified coarse fraction, the tip cap, and the purified fines, producing tortillas from the milled purified coarse fraction, the milled tip cap, and the milled purified fines.

* * * * *